US012732433B2

(12) United States Patent
Huangfu et al.

(10) Patent No.: US 12,732,433 B2
(45) Date of Patent: Sep. 8, 2026

(54) ARTIFICIAL INTELLIGENCE-BASED COMMUNICATION METHOD AND COMMUNICATION APPARATUS

(71) Applicant: HUAWEI TECHNOLOGIES CO., LTD., Shenzhen (CN)

(72) Inventors: Yourui Huangfu, Hangzhou (CN); Jian Wang, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 616 days.

(21) Appl. No.: 18/160,791

(22) Filed: Jan. 27, 2023

(65) Prior Publication Data

US 2023/0179490 A1 Jun. 8, 2023

Related U.S. Application Data

(63) Continuation of application No. PCT/CN2021/107396, filed on Jul. 20, 2021.

(30) Foreign Application Priority Data

Jul. 30, 2020 (CN) ......................... 202010749648.4

(51) Int. Cl.

*H04L 41/16* (2022.01)
*H04W 28/08* (2023.01)
*H04W 36/22* (2009.01)

(52) U.S. Cl.

CPC ............. *H04L 41/16* (2013.01); *H04W 28/08* (2013.01); *H04W 36/22* (2013.01)

(58) Field of Classification Search

CPC ......... H04L 41/16; H04L 41/14; H04L 43/06; H04L 43/08; H04W 28/08; H04W 36/22;

(Continued)

(56) References Cited

U.S. PATENT DOCUMENTS

2020/0112899 A1* 4/2020 Mysore Annaiah ......................... H04W 36/0085
2020/0322775 A1* 10/2020 Lee ......................... H04W 8/02

(Continued)

FOREIGN PATENT DOCUMENTS

CN 109213597 A 1/2019
WO 2021244334 A1 12/2021

OTHER PUBLICATIONS

3GPP TR 23.700-91 V0.4.0 “3rd Generation Partnership Project; Technical Specification Group Services and System Aspects; Study on enablers for network automation for the 5G System (5GS)”; Phase 2 Release 17 (Year: 2020).*

(Continued)

*Primary Examiner* — Jae Y Lee
*Assistant Examiner* — Nhu Pham
(74) *Attorney, Agent, or Firm* — Fish & Richardson P.C.

(57) ABSTRACT

This application provides a method and communication apparatus. In an example method, a first communication apparatus obtains a first artificial intelligence (AI) model corresponding to a first task. The first communication apparatus obtains first data corresponding to a first feature, where the first feature is a feature of data processed by using the first AI model, and the first data is used for drawing inferences for decision-making of the first task. The first communication apparatus determines an inference result for the decision-making of the first task based on the first data and the first AI model.

20 Claims, 9 Drawing Sheets

(58) Field of Classification Search

CPC . H04W 24/04; H04W 52/0206; H04W 16/00; H04W 36/0083; H04W 24/02; H04W 24/10; H04W 16/22; H04W 36/0005; H04W 36/34; H04W 52/02; Y02D 30/70

See application file for complete search history.

(56) References Cited

U.S. PATENT DOCUMENTS

| | | | | |
|---|---|---|---|---|
| 2021/0051060 | A1* | 2/2021 | Parvataneni | H04L 43/16 |
| 2022/0116814 | A1* | 4/2022 | Di Girolamo | H04L 65/80 |
| 2023/0087821 | A1* | 3/2023 | Xu | G06F 18/295<br>706/12 |

OTHER PUBLICATIONS

TSG RAN Chairman, "Preparing for Rel-17," 3GPP TSG RAN Meeting #84, RP-191551, Newport Beach, USA, Jun. 3-6, 2019, 12 pages.

3GPP TR 23.700-91 V0.4.0, "3rd Generation Partnership Project; Technical Specification Group Services and System Aspects; Study on enablers for network automation for the 5G System (5GS); Phase 2 (Release 17)," Jun. 2020, 186 pages.

China Mobile et al., "New Key Issue: Functionality Separation from NWDAF," 3GPP TSG-SA WG2 Meeting #135, S2-1909970, Split, Croatia, Oct. 14-18, 2019, 3 pages.

Zte, "Discussion on the usage of AI model," 3SA WG2 Meeting #135, S2-1908945, Split, Croatia, Oct. 14-18, 2019, 3 pages.

International Search Report and Written Opinion in International Appln. No. PCT/CN2021/107396, mailed on Oct. 21, 2021, 15 pages (with English translation).

Extended European Search Report in European Appln. No. 21849503.4, mailed on Dec. 14, 2023, 12 pages.

3GPP TS 38.423 V16.2.0, 3rd Generation Partnership Project; Technical Specification Group Radio Access Network; NG-RAN; Xn application protocol (XnAP) (Release 16), Jul. 2020, 447 pages.

3GPP TS 38.300 V15.10.0, 3rd Generation Partnership Project; Technical Specification Group Radio Access Network; NR; NR and NG-RAN Overall Description; Stage 2 (Release 15), Jul. 2020, 100 pages.

* cited by examiner

ARTIFICIAL INTELLIGENCE-BASED COMMUNICATION METHOD AND COMMUNICATION APPARATUS

CROSS-REFERENCE TO RELATED APPLICATIONS

This application is a continuation of International Application No. PCT/CN2021/107396, filed on Jul. 20, 2021, which claims priority to Chinese Patent Application No. 202010749648.4, filed on Jul. 30, 2020. The disclosures of the aforementioned applications are hereby incorporated by reference in their entireties.

TECHNICAL FIELD

Embodiments of this application relate to the field of communication, and more specifically, to an artificial intelligence-based communication method and communication apparatus.

BACKGROUND

With popularization of communication technologies, requirements on communication systems are increasingly high. For example, in a moving process of a terminal device, handover between cells is bound to occur. A handover policy greatly affects both of user experience and network performance. For example, an inappropriate handover policy may lead to premature handover, delayed handover, handover to a wrong cell, unnecessary handover, and ping-pong handover. For another example, load balancing is a main means for implementing resource utilization optimization and improving user experience, and an inappropriate cell selection, reselection, or handover policy of the terminal device greatly affects an effect of the load balancing. For another example, how to balance cell coverage and power consumption is a difficult problem for telecommunication operators. Inappropriate coverage increasing leads to waste of power consumption, and an inappropriate energy saving policy leads to decreased cell coverage.

Facing the increasing problems described above, how to quickly and effectively provide a solution and provide an appropriate processing policy to improve communication performance and user experience has become an urgent problem to be resolved in the industry.

SUMMARY

This application provides an artificial intelligence-based communication method and communication apparatus, to improve communication performance and improve user experience.

According to a first aspect, an artificial intelligence-based communication method is provided, including: a first communication apparatus obtains a first artificial intelligence AI model corresponding to a first task. The first communication apparatus obtains first data corresponding to a first feature, where the first feature is a feature of data processed by using the first AI model, and the first data is used for drawing inferences for decision-making of the first task. The first communication apparatus determines an inference result for the decision-making of the first task based on the first data and the first AI model.

According to the solution provided in this application, artificial intelligence (AI) needs to be used to assist in drawing inferences of network behavior, so that impact of incorrect network behavior on communication performance can be avoided, thereby improving user experience.

The first communication apparatus may also be referred to as an executor of an AI inference task or a processing network element.

The second communication apparatus may also be referred to as an initiator of an AI processing task or an initiating network element.

In addition, the solution in this application may be applied to a plurality of scenarios. In different scenarios, specific communication devices used as the second communication apparatus (namely, the initiating network element) are different.

For example, when an inference task for network behavior (for example, mobility management) of a terminal device is performed, the initiating network element may be the terminal device, may be an access network device serving the terminal device, or may be a core network device of a network in which the terminal device is located. This is not particularly limited in this application.

For another example, when an inference task for network behavior (for example, load balancing) on a network side is performed, the initiating network element may be the access network device or the core network device. This is not particularly limited in this application.

In this application, the first communication apparatus (namely, the processing network element) may be a network element independently disposed in a communication system (for example, a core network or an access network). Alternatively, the second communication apparatus (namely, the processing network element) may be integrated into an existing network element (for example, the access network device or the core network device) in a communication system (for example, a core network or an access network). This is not particularly limited in this application.

In an implementation, the first communication apparatus may actively perform the AI inference task for the second communication apparatus, for example, may perform the AI inference task based on event triggering or periodic execution. In this case, the first communication apparatus may determine the first task by itself.

In another implementation, the first communication apparatus may perform the AI inference task based on a request of the second communication apparatus. In other words, in this case, the method further includes: the first communication apparatus receives a first request sent by the second communication apparatus, where the first request is used to request the inference result for the decision-making of the first task, and the first request includes an identifier of the first task.

In this application, the identifier of the first task may also be referred to as an index of the first task, information about the first task, or the like, and is used to uniquely indicate the first task, or uniquely indicate the first task in a plurality of tasks. That is, the first communication apparatus can uniquely determine the first task based on the identifier of the first task. In the following, to avoid repetition, descriptions of the same or similar cases are omitted.

In an implementation, when the first communication device apparatus is performing or capable of performing corresponding processing or network behavior based on the inference result for the decision-making of the first task, the first communication apparatus may perform processing based on the inference result for the decision-making of the first task.

In another implementation, the method further includes: the first communication apparatus sends the inference result to the second communication apparatus. In this way, the second communication apparatus may perform processing based on the inference result for the decision-making of the first task, or the second communication apparatus may send the inference result for the decision-making of the first task to a network element that can perform corresponding processing or network behavior based on the inference result for the decision-making of the first task.

In an implementation, the first AI model is stored in the first communication apparatus. In this case, that a first communication apparatus obtains a first AI model corresponding to a first task includes: The first communication apparatus determines, based on a first mapping relationship, an AI model corresponding to the identifier of the first task as the first AI model, where the first mapping relationship is used to indicate a correspondence between a plurality of identifiers and a plurality of AI models.

In an implementation, the first AI model is not stored in the first communication apparatus. In this case, a third communication apparatus configured to store the AI model may be provided in the communication system, and that a first communication apparatus obtains a first AI model corresponding to a first task includes: the first communication apparatus sends a second request to the third communication apparatus, where the second request includes the identifier of the first task, and the second request is used to request to obtain the AI model corresponding to the identifier of the first task. The first communication apparatus receives the first AI model sent by the third communication apparatus.

In an implementation, the first task is a task for the second communication apparatus, and data used for drawing inferences for the first task is stored in the second communication apparatus. In this case, that the first communication apparatus obtains first data corresponding to a first feature includes: the first communication apparatus sends a third request to the second communication apparatus, where the third request includes indication information of the first feature, and the second request is used to request to obtain data corresponding to the first feature. The first communication apparatus receives the first data sent by the second communication apparatus.

In an implementation, the first task is a task for the second communication apparatus, and data used for drawing inferences for the first task is not stored in the second communication apparatus. In the communication system, a fifth communication apparatus configured to store data used for AI inference (for example, input data of the AI model) may be configured, and that the first communication apparatus obtains first data corresponding to a first feature includes: the first communication apparatus sends a fourth request to the fifth communication apparatus, where the fourth request includes indication information of the first feature, and the second request is used to request to obtain data corresponding to the first feature. The first communication apparatus receives the first data sent by the fifth communication apparatus.

Optionally, the method further includes: the first communication apparatus sends a correspondence between the identifier of the first task, the first data, and the inference result to a fourth communication apparatus, where the fourth communication apparatus is configured to store training data of the AI model.

Optionally, the inference result for the decision-making of the first task includes a future value corresponding to the first data.

In addition, in an implementation, the future value corresponding to the first data includes a plurality of values, and the inference result includes a probability of each of the plurality of future values.

Optionally, the inference result for the decision-making of the first task includes a preferred network decision result corresponding to the first data.

In addition, in an implementation, the network decision result includes a plurality of decision results, and the inference result includes a probability of each of the plurality of decision results.

By way of example rather than limitation, the solution in this application is applicable to one or more of the following scenarios.

Scenario 1

The first task includes mobility enhancement optimization of a terminal device.

In this case, the first data includes at least one of the following data: a first measurement report of the terminal device, a first user behavior profile of the terminal device, and resource utilization of the terminal device.

Correspondingly, the inference result for the decision-making of the first task includes a size of a reserved resource of the terminal device.

For example, the inference result for the decision-making of the first task includes a probability of each of a plurality of possible values of the reserved resource of the terminal device.

The first measurement report may include information about a channel or a cell detected by the terminal device. For example, the first measurement report may include but is not limited to one or more of the following information or parameters:

a measurement report of a primary serving cell, a measurement report of a neighboring cell, channel power, interference power, noise power, a channel quality indicator, reference signal received power, reference signal received quality, a received signal strength indicator, a signal to interference plus noise ratio, a minimization of drive tests (MDT) report, a channel complex value, a channel value real part, a channel value imaginary part, a channel power delay spectrum, a channel angle power spectrum, a channel multipath angle of arrival, a channel multipath angle of departure, a channel multipath pitch of arrival, and a channel multipath pitch of departure.

By way of example rather than limitation, the first user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

In addition, the first data may further include related information of the primary serving cell or the neighboring cell, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, cell energy efficiency, and the like.

Scenario 2

The first task includes access mode optimization of the terminal device.

In this case, the first data includes at least one of the following data: a second measurement report of a terminal device and a random access report of the terminal device.

Correspondingly, the inference result for the decision-making of the first task includes a quantity of times of two-step random access attempts of the terminal device.

For example, the inference result for the decision-making of the first task includes a probability of each of a plurality of possible times of two-step random access attempts of the terminal device.

The second measurement report may include information about a channel or a cell detected by the terminal device. For example, the first measurement report may include but is not limited to one or more of the following information or parameters:

a measurement report of a primary serving cell, a measurement report of a neighboring cell, channel power, interference power, noise power, a channel quality indicator, reference signal received power, reference signal received quality, a received signal strength indicator, a signal to interference plus noise ratio, a minimization of drive tests report, a channel complex value, a channel value real part, a channel value imaginary part, a channel power delay spectrum, a channel angle power spectrum, a channel multipath angle of arrival, a channel multipath angle of departure, a channel multipath pitch of arrival, and a channel multipath pitch of departure.

It should be noted that, the second measurement report and the foregoing first measurement may be the same or different, or in other words, a measurement report used for the access mode optimization may be the same or different from a measurement report used for the mobility enhancement optimization, and this is limited in this application.

Similarly, in applicable scenarios enumerated in this application, specific information or parameters included in a same type of input data applicable to two different scenarios may be the same or different, and this is not particularly limited in this application. To avoid repetition, descriptions of the same or similar cases are omitted below.

In addition, the first data may further include related information of a to-be-accessed cell, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

Scenario 3

The first task includes radio access network notification area (RNA) optimization.

In this case, the first data includes at least one of the following data: a second user behavior profile of a terminal device accessing a radio access network, a location of a first cell of the radio access network, and signaling overheads of a notification area of the radio access network.

Correspondingly, the inference result for the decision-making of the first task includes a determining result of whether to provide the first cell as a notification area for the terminal device.

For example, the inference result for the decision-making of the first task includes a probability of providing the first cell as the notification area for the terminal device and not providing the first cell as the notification area for the terminal device.

In addition, the first data may further include related information of the first cell, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

Scenario 4

The first task includes radio resource management policy optimization of a terminal device.

In this case, the first data includes at least one of the following data: a third user behavior profile of the terminal device, a quantity of active users of a cell in which the terminal device is located, and resource utilization of the terminal device.

Correspondingly, the inference result for the decision-making of the first task includes a radio resource management policy.

By way of example rather than limitation, the third user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

In addition, by way of example rather than limitation, the radio resource management policy may include but is not limited to power control, channel allocation, scheduling, handover, access control, load control, end-to-end quality of service QoS, adaptive code modulation, or the like.

In addition, the first data may further include related information of the cell in which the terminal device is located, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB)

utilization, a quantity of active users, a random access quantity, a cell type, a transmit power class, a quantity of available resources, cell load, a traffic type, a cell location, cell power consumption, a cell capacity, and cell energy efficiency.

Scenario 5

The first task includes optimization of matching between an application layer of a terminal device and a radio access network.

The first data includes at least one of the following data: a fourth user behavior profile of the terminal device, a rate requirement of a first application of the terminal device, and quality of service of the terminal device.

Correspondingly, the inference result for the decision-making of the first task includes an adjustable rate of the first application.

For example, the inference result for the decision-making of the first task includes a probability of each adjustable quantity of a plurality of adjustable rates of the first application.

By way of example rather than limitation, the fourth user behavior profile may include but is not limited to one or more of the following information or parameters of the terminal device:

environment information, location distribution, mobility, weather, time, configuration of a terminal device (for example, configuration on a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, an event report, application-layer authorization information, information collected by a sensor, a call record, a financial status, social media information, and a data rate requirement of an application.

In addition, the first data may further include related information of a radio access network in which the terminal device is located, for example, radio resource control signaling overheads, a call setup success rate, a radio frequency link failure indication, an access failure rate, a handover failure rate, a call success rate, a handover success rate, a call drop rate, voice quality, a session success rate, service setup time, a session drop rate, data flow quality, a jitter, a delay, a throughput, a service rate, a service rate requirement, quality of service, user experience quality, and a random access report.

In addition, the first data may further include related information of a cell in which the terminal device is located, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

Scenario 6

The first task includes mobility robustness optimization of a terminal device.

The first data includes at least one of the following information: a third measurement report of the terminal device and a handover report of the terminal device.

Correspondingly, the inference result for the decision-making of the first task includes a handover policy of the terminal device.

The inference result for the decision-making of the first task includes a handover effect corresponding to the handover policy of the terminal device.

For example, the handover policy may include a target cell to be handed over to, time for handing over to the target cell, and the like.

The third measurement report may include information about a channel or a cell detected by the terminal device. For example, the first measurement report may include but is not limited to one or more of the following information or parameters:

a measurement report of a primary serving cell, a measurement report of a neighboring cell, channel power, interference power, noise power, a channel quality indicator, reference signal received power, reference signal received quality, a received signal strength indicator, a signal to interference plus noise ratio, a minimization of drive tests report, a channel complex value, a channel value real part, a channel value imaginary part, a channel power delay spectrum, a channel angle power spectrum, a channel multipath angle of arrival, a channel multipath angle of departure, a channel multipath pitch of arrival, and a channel multipath pitch of departure.

In addition, the first data may further include related information of the cell in which the terminal device is located, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

In addition, the first data may further include related information of a radio access network in which the terminal device is located, for example, radio resource control signaling overheads, a call setup success rate, a radio frequency link failure indication, an access failure rate, a handover failure rate, a call success rate, a handover success rate, a call drop rate, voice quality, a session success rate, service setup time, a session drop rate, data flow quality, a jitter, a delay, a throughput, a service rate, a service rate requirement, quality of service, user experience quality, and a random access report.

Scenario 8: The first task includes mobility load balancing optimization of a cell.

The first data includes load of the cell and a fifth user behavior profile of a terminal device in the cell.

The inference result for the decision-making of the first task includes measurement of mobility processing of one or more terminal devices in the cell, and the mobility processing includes at least one of cell reselection, cell handover, or cell selection.

By way of example rather than limitation, the fifth user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

In addition, the first data may further include related information of the cell, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

Scenario 9: The first task includes coverage optimization of a cell.

The first data includes a minimization of drive tests MDT report of the cell and coverage of the cell.

The inference result for the decision-making of the first task includes a coverage adjustment policy of the cell.

By way of example rather than limitation, the coverage adjustment policy may include an adjustment policy of at least one of the following parameters:

an antenna pitch angle, antenna transmit power, a quantity of antennas, and a beam transmit direction.

Scenario 10: The first task includes capacity optimization of a cell.

The first data includes an MDT report of the cell, a fourth measurement report of a terminal device in the cell, a sixth behavior profile of the terminal device in the cell, coverage of the cell, and the capacity of the cell.

The inference result for the decision-making of the first task includes a capacity adjustment policy of the cell.

By way of example rather than limitation, the cell capacity may be adjusted by controlling a quantity of terminal devices allowed to access the cell, or the cell capacity may be adjusted by controlling a parameter of a base station (for example, an antenna of the base station) of the cell.

The fourth measurement report may include information about a channel or a cell detected by the terminal device. For example, the first measurement report may include but is not limited to one or more of the following information or parameters:

a measurement report of a primary serving cell, a measurement report of a neighboring cell, channel power, interference power, noise power, a channel quality indicator, reference signal received power, reference signal received quality, a received signal strength indicator, a signal to interference plus noise ratio, a minimization of drive tests report, a channel complex value, a channel value real part, a channel value imaginary part, a channel power delay spectrum, a channel angle power spectrum, a channel multipath angle of arrival, a channel multipath angle of departure, a channel multipath pitch of arrival, and a channel multipath pitch of departure.

By way of example rather than limitation, the sixth user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

Scenario 11: The first task includes energy saving optimization of a cell.

The first data includes at least one of the following information: power consumption of the cell, a seventh user behavior profile of a terminal device in the cell, and capability efficiency of the cell.

The inference result for the decision-making of the first task includes a power consumption adjustment policy of the cell.

By way of example rather than limitation, the seventh user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

Scenario 12: The first task includes handover optimization of a terminal device.

The first data includes load of a plurality of cells, power consumption of the plurality of cells, an eighth user behavior profile of the terminal device, an average of the power consumption of the plurality of cells, or an average of the load of the plurality of cells.

The inference result for the decision-making of the first task includes a handover policy of one or more terminals in the cell.

By way of example rather than limitation, the seventh user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

In addition, the first data may further include related information of the cell in which the terminal device is located, for example, a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, cell coverage, physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

Scenario 13: The first task includes handover optimization of a terminal device with load balancing as a target.

The first data includes at least one of the following information:

The first data includes load of a plurality of cells, power consumption of the plurality of cells, a second user behavior profile of the terminal device, and an average of the load of the plurality of cells.

The inference result for the decision-making of the first task includes a handover policy of one or more terminals in the cell.

By way of example rather than limitation, the second user behavior profile may include but is not limited to one or more of the following information or parameters of the terminal device:

environment information, location distribution, mobility, weather, time, configuration of a terminal device (for example, configuration of a physical layer), a model of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

Scenario 14: The first task includes parameter configuration optimization of an access network device.

The first data includes at least one of the following information:

a traffic report of the access network device, channel quality of the access network device, a service type report of a service provided by the access network device, a service rate requirement of the service provided by the access network device, quality of service of the service provided by the access network device, and a service rate of the service provided by the access network device.

In addition, the first data may further include related information of a radio access network, for example, radio resource control signaling overheads, a call setup success rate, a radio frequency link failure indication, an access failure rate, a handover failure rate, a call success rate, a handover success rate, a call drop rate, voice quality, a session success rate, service setup time, a session drop rate, data flow quality, a jitter, a delay, a throughput, a service rate, a service rate requirement, quality of service, user experience quality, and a random access report.

According to a second aspect, a communication method is provided, including: a second communication apparatus sends a first request to a first communication apparatus, where the first request is used to request an inference result for decision-making of a first task, and the first request includes an identifier of the first task. The second communication apparatus receives a third request sent by the first communication apparatus, where the third request includes indication information of a first feature, and the third request is used to request to obtain data corresponding to the first feature. The second communication apparatus sends first data corresponding to the first feature to the first communication apparatus. The second communication apparatus receives the inference result sent by the first communication apparatus, where the inference result is determined based on the first data and a first artificial intelligence AI model corresponding to the first task, and the first feature is a feature of data processed by using the first AI model.

Optionally, the method further includes: the first communication apparatus sends a correspondence between the identifier of the first task, the first data, and the inference result to a fourth communication apparatus, where the fourth communication apparatus is configured to store training data of the AI model.

Optionally, the decision-making of the first task includes a plurality of decision results, and the inference result includes a probability of each of the plurality of decision results.

In addition, applicable scenarios of the method provided in the second aspect are similar to the scenarios enumerated in the first aspect. Herein, to avoid repetition, detailed description thereof is omitted.

According to a third aspect, a communication apparatus is provided, including: a processing unit, configured to determine a first artificial intelligence AI model corresponding to a first task; and a transceiver unit, configured to receive first data corresponding to a first feature, where the first feature is a feature of data processed by using the first AI model, and the first data is used for drawing inferences for decision-making of the first task. The processing unit is further configured to determine an inference result for the decision-making of the first task based on the first data and the first AI model.

Optionally, the first task is a task for a second communication apparatus, and the transceiver unit is further configured to send the inference result to the second communication apparatus.

Optionally, the transceiver unit is further configured to receive a first request sent by the second communication apparatus, where the first request is used to request the inference result for the decision-making of the first task, and the first request includes an identifier of the first task.

Optionally, the processing unit is specifically configured to determine, based on a first mapping relationship, an AI model corresponding to the identifier of the first task as the first AI model, where the first mapping relationship is used to indicate a correspondence between a plurality of identifiers and a plurality of AI models.

Optionally, the transceiver unit is further configured to send a second request to a third communication apparatus, where the second request includes the identifier of the first task, and the second request is used to request to obtain the AI model corresponding to the identifier of the first task. The processing unit is specifically configured to determine the AI model received by the transceiver unit from the third communication apparatus as the first AI model.

Optionally, the first task is a task for the second communication apparatus. The transceiver unit is further configured to send a third request to the second communication apparatus, where the third request includes indication information of the first feature, and the second request is used to request to obtain data corresponding to the first feature and is used to receive the first data sent by the second communication apparatus.

Optionally, the transceiver unit is further configured to send a correspondence between the identifier of the first task, the first data, and the inference result to a fourth communication apparatus, where the fourth communication apparatus is configured to store training data of the AI model.

Optionally, the decision-making of the first task includes a plurality of decision results, and the inference result includes a probability of each of the plurality of decision results.

The units in the apparatus in the third aspect are respectively configured to perform steps of the communication method in any one of the first aspect and the implementations of the first aspect. To avoid repetition, detailed description of a specific implementation process is omitted.

In addition, applicable scenarios of the apparatus provided in the third aspect are similar to the scenarios enumerated in the first aspect. Herein, to avoid repetition, detailed description thereof is omitted.

In a design, the apparatus is a communication chip. The communication chip may include an input circuit or an interface configured to send information or data, and an output circuit or an interface configured to receive information or data.

In another design, the apparatus is a communication device, and the communication device may include a transmitter for transmitting information or data, and a receiver for receiving information or data.

According to a fourth aspect, a communication apparatus is provided, including: a processing unit, configured to generate a first request, where the first request is used to request an inference result for decision-making of a first task, and the first request includes an identifier of the first task; and a transceiver unit, configured to send the first request to a first communication apparatus, and configured to receive a third request sent by the first communication apparatus, where the third request includes indication information of a first feature, and the third request is used to obtain data corresponding to the first feature. The processing unit is further configured to obtain first data corresponding to the first feature. The transceiver unit is further configured to send the first data to the first communication apparatus. The transceiver unit is further configured to receive the inference result sent by the first communication apparatus, where the inference result is determined based on the first data and a first artificial intelligence AI model corresponding to the first task, and the first feature is a feature of data processed by using the first AI model.

Optionally, the transceiver unit is further configured to send a correspondence between the identifier of the first task, the first data, and the inference result to a fourth communication apparatus, where the fourth communication apparatus is configured to store training data of the AI model.

The units in the apparatus in the fourth aspect are respectively configured to perform steps of the communication method in any one of the second aspect and the implementations of the second aspect. To avoid repetition, detailed description of a specific implementation process is omitted.

In addition, applicable scenarios of the apparatus provided in the fourth aspect are similar to the scenarios enumerated in the first aspect. Herein, to avoid repetition, detailed description thereof is omitted.

In a design, the apparatus is a communication chip. The communication chip may include an input circuit or an interface configured to send information or data, and an output circuit or an interface configured to receive information or data.

In another design, the apparatus is a communication device, and the communication device may include a transmitter for transmitting information or data, and a receiver for receiving information or data.

According to a fifth aspect, a communication apparatus is provided, including a processor, where the processor is coupled to a memory, and can be configured to perform the method in the first aspect and the possible implementations of the first aspect. Optionally, the communication device further includes the memory. Optionally, the communication device further includes a communication interface, and the processor is coupled to the communication interface. Optionally, the communication device further includes a communication interface, and the processor is coupled to the communication interface.

In an implementation, the communication apparatus is a communication device. In this case, the communication interface may be a transceiver or an input/output interface. In another implementation, the communication device is a chip or a chip system. In this case, the communication interface may be an input/output interface, an interface circuit, an output circuit, an input circuit, a pin, or a related circuit on the chip or the chip system. The processor may also be embodied as a processing circuit or a logic circuit.

According to a sixth aspect, a communication apparatus is provided, including a processor, where the processor is coupled to a memory, and may be configured to perform the method in the second aspect and the possible implementations of the second aspect. Optionally, the communication device further includes the memory. Optionally, the communication device further includes a communication interface, and the processor is coupled to the communication interface. Optionally, the communication device further includes a communication interface, and the processor is coupled to the communication interface.

In an implementation, the communication apparatus is a communication device. In this case, the communication interface may be a transceiver or an input/output interface. In another implementation, the communication device is a chip or a chip system. In this case, the communication interface may be an input/output interface, an interface circuit, an output circuit, an input circuit, a pin, or a related circuit on the chip or the chip system. The processor may also be embodied as a processing circuit or a logic circuit.

According to a seventh aspect, a communication apparatus is provided, including an input circuit, an output circuit, and a processing circuit. The processing circuit is configured to receive a signal by using the input circuit, and transmit a signal by using the output circuit, to enable the method in any one of the first aspect and the possible implementations of the first aspect to be implemented.

In a specific implementation process, the communication apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments. Specific implementations of the processor and the circuits are not limited in embodiments of this application.

According to an eighth aspect, a communication apparatus is provided, including an input circuit, an output circuit, and a processing circuit. The processing circuit is configured to receive a signal by using the input circuit, and transmit a signal by using the output circuit, to enable the method in any one of the second aspect and the possible implementations of the second aspect to be implemented.

In a specific implementation process, the communication apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments. Specific implementations of the processor and the circuits are not limited in embodiments of this application.

According to a ninth aspect, a processing apparatus is provided, including a processor and a memory. The processor is configured to read instructions stored in the memory, receive a signal by using a receiver, and transmit a signal by using a transmitter, to perform the method in the first aspect and the possible implementations of the first aspect.

Optionally, there are one or more processors, and there are one or more memories.

Optionally, the memory may be integrated into the processor, or the memory and the processor are separately disposed.

According to a tenth aspect, a processing apparatus is provided, including a processor and a memory. The processor is configured to read instructions stored in the memory, receive a signal by using a receiver, and transmit a signal by using a transmitter, to perform the method in the second aspect and the possible implementations of the second aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated into a same chip, or may be respectively disposed on different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processor in the ninth aspect or the tenth aspect may be a chip. The processor may be implemented by hardware, or may be implemented by software. When implemented by hardware, the processor may be a logic circuit, an integrated circuit, or the like. When implemented by software, the processor may be a general-purpose processor, and is implemented by reading software code stored in the memory. The memory may be integrated in the processor, or may be located outside the processor and exists independently.

According to an eleventh aspect, a computer program product is provided. The computer program product includes a computer program (which may also be referred to as code or an instruction). When the computer program is run, a computer is enabled to perform the method in any one of the first aspect or the second aspect and the possible implementations thereof.

According to a twelfth aspect, a computer readable medium is provided. The computer readable medium stores a computer program (which may also be referred to as code or an instruction). When the computer program runs on a computer, the computer is enabled to perform the method in any one of the first aspect or the second aspect and the possible implementations thereof.

According to a thirteenth aspect, a communication system is provided, including the foregoing first communication apparatus and the foregoing second communication apparatus.

DESCRIPTION OF EMBODIMENTS

The following describes technical solutions of this application with reference to the accompanying drawings.

First, a communication system to which an artificial intelligence-based communication method and apparatus in this application are applicable is described with reference to FIG. 1 and FIG. 3.

The technical solutions in the embodiments of this application may be applied to various communication systems, for example, a long term evolution (LTE) system, an LTE frequency division duplex (FDD) system, an LTE time division duplex (TDD) system, a universal mobile telecommunication system (UMTS), a fifth generation (5G) system or new radio (NR), and other future communication systems.

Figure 1:
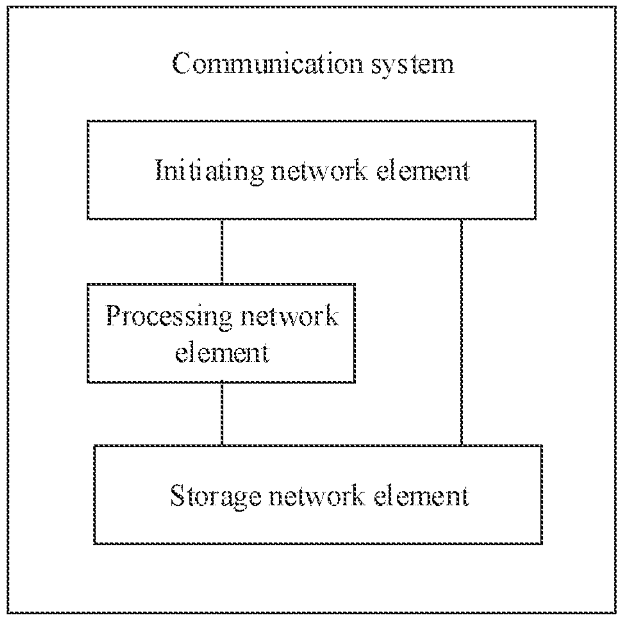
FIG. 1 is a schematic diagram of an architecture of an example of a communication system according to this application.

FIG. 1 is a schematic diagram of an architecture of an example of a communication system according to this application. As shown in FIG. 1, the communication system in this application includes but is not limited to an initiating network element, a processing network element, and a storage network element.

The initiating network element (that is, an example of a first communication apparatus) is in communication connection with the processing network element (that is, an example of a second communication apparatus). For example, the initiating network element may be directly in communication connection with the processing network element, or the initiating network element may be indirectly in communication connection with the processing network element by using one or more network elements.

The processing network element is in communication connection with the storage network element. For example, the processing network element may be directly in communication connection with the storage network element, or the processing network element may be indirectly in communication connection with the storage network element by using one or more network elements.

The initiating network element is in communication connection with the storage network element. For example, the initiating network element may be directly in communication connection with the storage network element, or the initiating network element may be indirectly in communication connection with the storage network element by using one or more network elements.

The storage network element stores one or more AI models.

In addition, the storage network element stores training data, and may perform AI model training based on the training data.

The initiating network element is an initiator of a task. The task is a network element that needs to draw decision result inferences based on an AI model. That is, when a decision result of a specific task needs to be obtained, the initiating network element may request the processing network element to draw inferences for the task.

The processing network element stores one or more AI models, and the processing network element may determine, in the AI models stored by the processing network element, an AI model applicable to the task. Alternatively, the processing network element may obtain, from the storage network element, an AI model applicable to the task.

Figure 2:
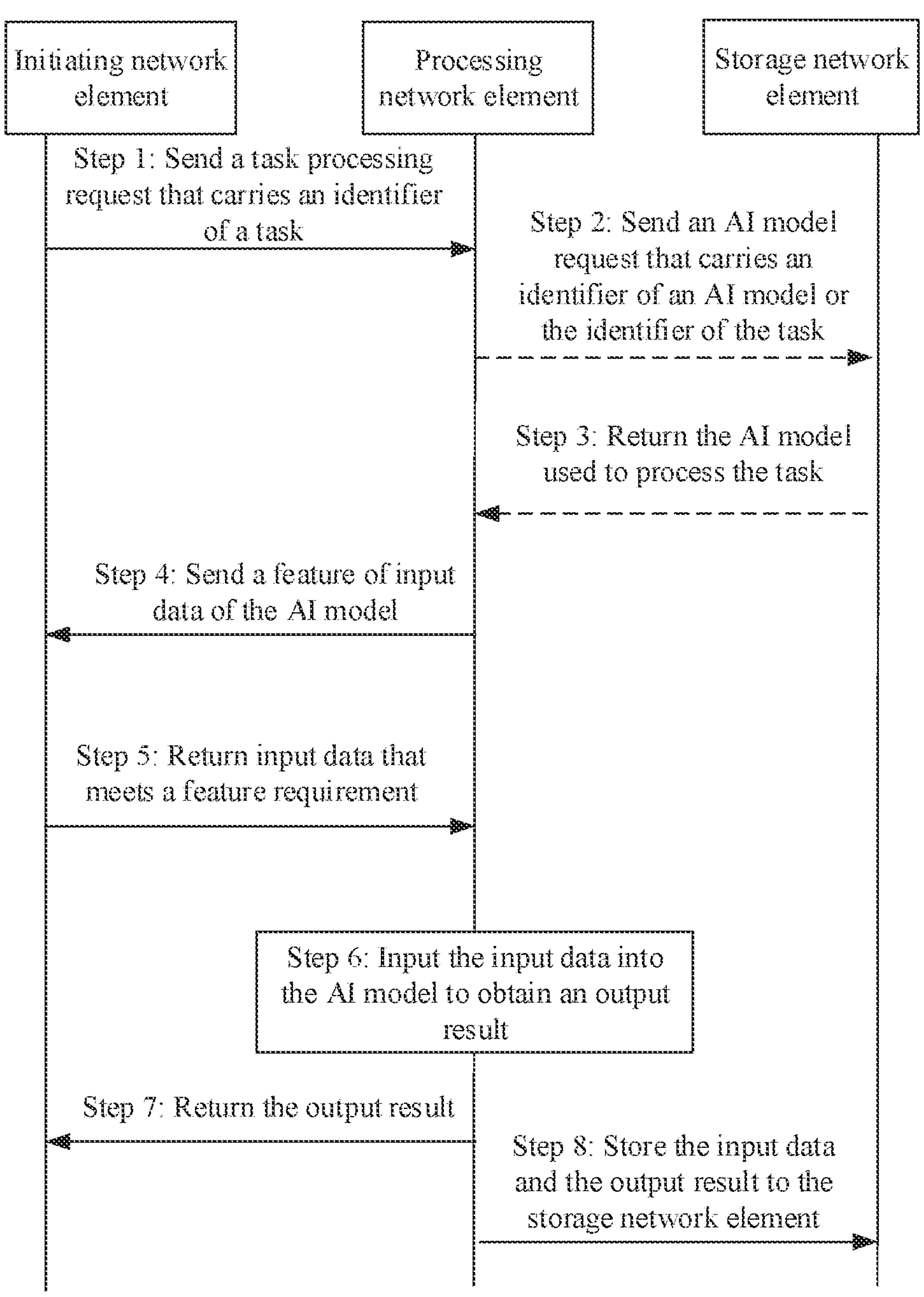
FIG. 2 is a schematic diagram of interaction in an example of a communication process according to this application.

FIG. 2 shows an example of a communication process according to this application. As shown in FIG. 2, in step 1, an initiating network element sends a task processing request to a processing network element. For example, the task processing request may include information about a task that needs to be processed, for example, a feature of data (input data) used for inference for the task or a type of the task.

In an implementation, the processing network element may store a plurality of AI models applicable to a plurality of different (types of) tasks, so that the processing network element may determine an AI model used to process the task, and determine a requirement of the AI model on the input data (that is, the feature of the input data).

In another implementation, in step 2, the processing network element may send an AI model request to the storage network element, where the AI model request may include an identifier of the task to be processed or an identifier of an AI model used to process the task to be processed. In step 3, the storage network element may send the AI model to the processing network element.

Therefore, in step 4, the processing network element sends a requirement of the AI model on the input data (that is, the feature of the input data) to the initiating network element.

In step 5, the initiating network element may preprocess, based on the feature, the input data used for the inference for the task, so that the input data meets the feature; and send the processed input data to the processing network element.

In step 6, after obtaining the input data, the processing network element inputs the input data into the AI model to obtain an output result.

In an implementation, if the processing network element can correspondingly control a network status based on the output result, the processing network element may directly perform processing based on the output result.

In another implementation, in step 7, the processing network element may return the output result to the initiating network element. Therefore, the initiating network element may perform corresponding control based on the output result.

In addition, by way of example rather than limitation, in step 8, the initiating network element or the processing network element may store the input data and the output result to the storage network element.

For example, the initiating network element requests the processing network element to perform a channel prediction task, where to-be-processed data is in a time dimension and has 100 historical moments, and a channel state at a next moment needs to be predicted by using an AI model. After receiving the task, the processing network element searches for a model that is most suitable for the task from a plurality of AI models. For example, an AI model used for channel prediction is found. The processing network element sends a feature (for example, a maximum of 20 historical data records are required in the time dimension) of input data corresponding to the AI model to the initiating network element. Therefore, the processing network element may intercept raw data based on the feature, for example, select latest obtained channel data of 20 historical moments as the input data, and send the input data to the processing network element. After obtaining the input data, the processing network element confirms that the input data meets a requirement of the AI model, then inputs the input data into the AI model to obtain an inference result (that is, output data), and returns the inference result (that is, the output data) to the initiating network element. After receiving the inference result, namely, a channel prediction result, the initiating network element may use a predicted channel for a downstream task such as precoding selection or antenna selection, and the initiating network element may further store a channel at a historical moment and the predicted channel as a group of training data in the storage network element.

Optionally, the processing network element may further send configuration (or a parameter) of an AI model to the initiating network element, where the configuration may include input-side configuration and/or output-side configuration. The configuration of the AI model may be used by the initiating network element to determine processing of input data (for example, content and a format of the input data) and output data of the AI model.

The input-side configuration may include but is not limited to one or more of the following: a data preprocessing operation (or content or a type of a data preprocessing operation), hyperparameter configuration, an inference mode, a training mode, inference precision, training precision, a running termination condition, hardware running configuration, whether to call a pre-training model, whether output data is used as input data, a loss function (LossFun) design, and a reward function (reward) design.

The output-side configuration may include but is not limited to one or more of the following: an output softmax function, sampling manner configuration, whether storage is required, hyperparameter modification, whether output is followed by a long short-term memory (LSTM) network, parameter output of the model, and gradient output of an optimizer.

For use of the input data, in addition to being used in channel prediction, which has relatively high real-time performance, the input data may be alternatively first stored, and a network element (for example, the processing network element or the storage network element) that stores an AI model may invoke the stored input data to train the AI model of the network element. For example, when optimizing a current AI model used for channel prediction, the processing network element sends a training data obtaining request to the storage network element, where the request may carry related information of the channel prediction task. After receiving the request, the storage network element sends channel data used for the channel prediction. The processing network element receives channel data and trains (or updates) the AI model of the processing network element. Then, the processing network element may send the updated AI model to the storage network element, that is, the storage network element may store not only the training data, but also the AI model, or even an intermediate result of the training, such as a training gradient. "Storing the AI model" may be understood as storing a related parameter of the AI model, a parameter of a neural network, a parameter of a machine learning algorithm, and the like.

In addition, the network elements in the communication system may come from different vendors. To share the AI model, the input data may have a standardized and self-explanatory feature. For example, the input data includes two parts: preprocessed data and a parameter of the AI model. The preprocessed data is data obtained after the raw data that is of the initiating network element and that is used for task inference is preprocessed based on the AI model parameter, and the preprocessed data further includes an AI data header and a data group. The data group includes data obtained by processing the raw data based on the parameter of the AI model. The data group can be directly input to the AI model for inference or training. The AI data header includes a source, a purpose, basic information, and the like of the described data. For example, AI task-related information indicates that a usage scenario is mobility robustness optimization, and an ID is 1. The ID may be negotiated between two parties in communication, that is, the other party can learn of the information that the task is the mobility robustness optimization by receiving the ID 1. For the neural network, input and output dimensions of the network are fixed. Therefore, data needs to be cut based on a network size. The AI task-related information includes the input and output dimensions and data meanings thereof, to facilitate AI model confirmation.

For example, it is assumed that the input data is 20 reference signal received power (RSRP) values, and the output data is one of two actions (handing over and non-handing over). In this example, the AI data is used to train the AI model. Therefore, each row in the data group includes 20 inputs and one output, and one output represents whether to hand over or not in the case of the 20 inputs. The output can help train the AI model, so that the input is closer to the output value after passing through the AI model, so as to train the AI model. A quantity of rows in the data group represents a quantity of groups of such input and output pairs. Usually, the AI model requires a large amount of data to converge. Therefore, the quantity of rows may be quite large. When the AI model is used for inference, there may be one row or a few rows. There is no special requirement on the quantity of rows in the data group. A data generation main body indicates a source of data, so that the data can be traced and reproduced. For example, if the data comes from a specific terminal device, a UE ID of the data is recorded. A data type indicates a type of the data, which may be a network status, a network decision, network performance, a neural network parameter, or a training optimization gradient. The network status refers to data that is directly collected from a communication system and that indicates a current state of a network, such as a channel state and a resource allocation state, and is usually used as an input of the AI model to generate a subsequent decision. The network decision refers to an action, such as a handover action and a resource allocation action, taken by a current communication system, and refers to an action taken by the communication system in the current state of the network. The network performance refers to a result, such as a success or a failure, and a system throughput value, obtained after the communication system makes a network decision. In this example, data types are the network status and the network decision. The input is the network status, and the output is the network decision. An information stamp indicates related information such as a location and time of data collection, a dimension of the data group, a data description, data precision, and the like. A label indicator bit indicates a location at which label data is placed in the data group. The label data is the output data and is used as a label in supervised learning. In this example, the label data is a network decision of handing over or non-handing over. For example, each row includes 20 RSRP values and one label indicating whether to hand over or not. One row of data is represented by one set. The data group includes a plurality of such sets, where each set { } has at least one element: network status, that is, {network status}. Self-supervised or unsupervised learning can be realized when the network status is a sequence in a specific dimension such as time, frequency, and space. That is, the network status is used as both an input and an output. The set may include two elements: {network status; label}. The network status and the label are respectively used as the input and output of the AI model to implement supervised learning. The label may be a network status, a network decision, network performance, or the like. The set may include three elements: {network status; network decision; network performance}. The network status, the network decision, and the network performance respectively correspond to observation, action, and reward in reinforcement learning, to implement the reinforcement learning, including multi-agent reinforcement learning.

Figure 3:
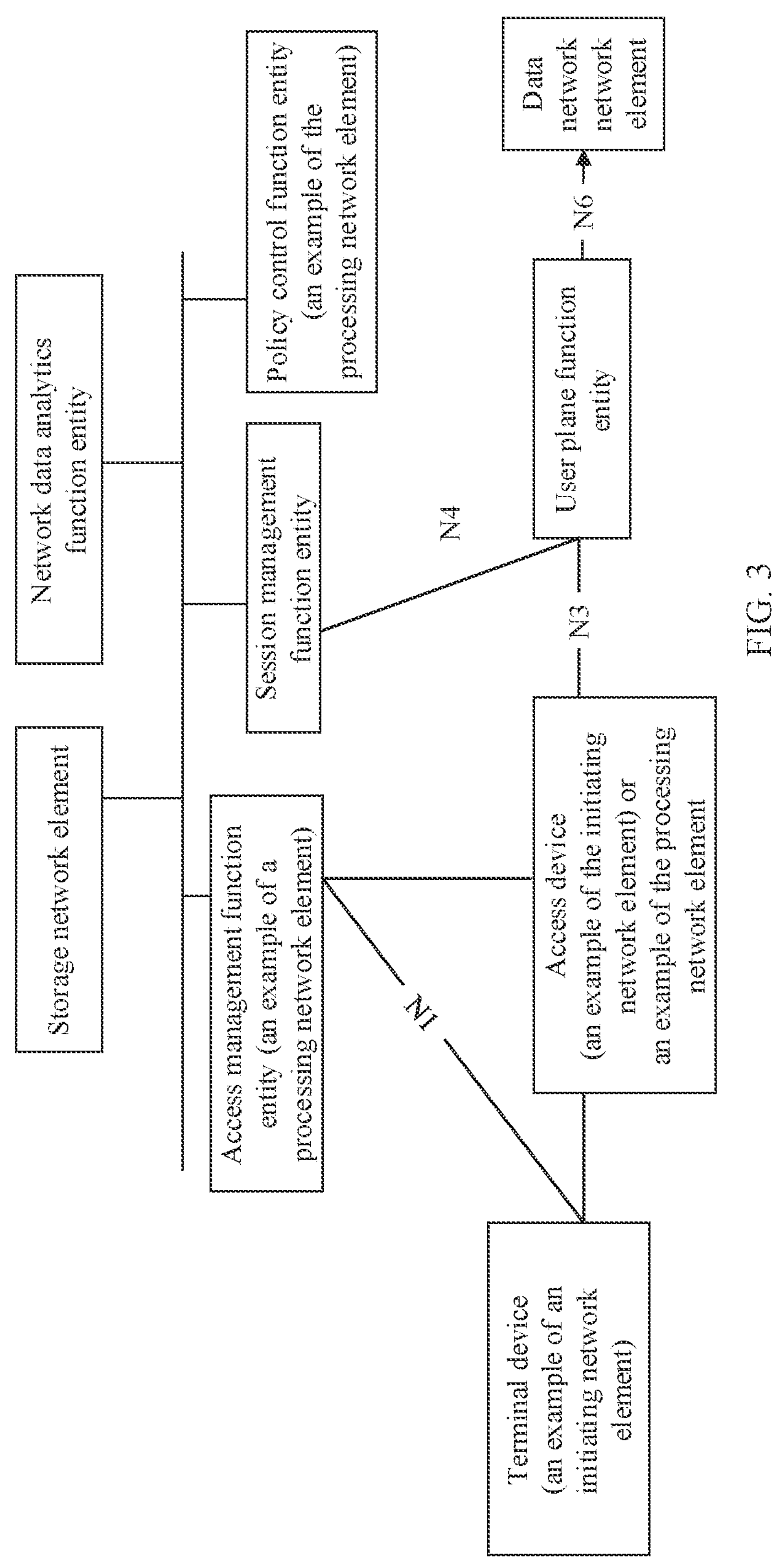
FIG. 3 is a schematic diagram of an architecture of another example of a communication system according to this application.

FIG. 3 is a schematic diagram of an architecture of another example of a communication system according to this application. As shown in FIG. 3, the communication system includes but is not limited to the following network elements.

1. Terminal Device

The terminal device in this embodiment of this application may also be referred to as user equipment (UE), a mobile station (MS), a mobile terminal (MT), an access terminal, a subscriber unit, a subscriber station, a mobile station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device that has a wireless connection function or an in-vehicle device. Currently, some examples of terminals are: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a 5G network, a terminal device in an evolved public land mobile communication network (PLMN), or the like. This is not limited in this embodiment of this application.

By way of example rather than limitation, in embodiments of this application, the terminal device may alternatively be a wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in this embodiment of this application, the terminal device may be alternatively a terminal device in an internet of things (IoT) system. The IoT is an important component of future information technology development, and a main technical feature thereof is that an object is connected to a network by using a communication technology. In this way, an intelligent network of human-machine interconnection and thing-thing interconnection is realized.

In this embodiment of this application, the IOT technology may be used by using, for example, a narrow band (NB) technology, to achieve mass connection, deep coverage, and power saving of the terminal. For example, the NB may include a resource block (RB), that is, bandwidth of the NB is only 180 KB. To implement mass access, it is required that terminals be discrete in access. According to the communication method in this embodiment of this application, a congestion problem caused when massive terminals in the IOT technology access a network through the NB can be effectively resolved.

In addition, in this embodiment of this application, the terminal device may be alternatively a terminal device in a massive machine type communication (mMTC) system. The mMTC is mainly information interaction between a person and an object and developed in a frequency band below 6 GHz, and also applies to large-scale internet of things.

In addition, in this embodiment of this application, the terminal device may further communicate with a terminal device in another communication system, for example, perform inter-device communication. For example, the terminal device may further transmit (for example, send and/or receive) a time synchronization packet with the terminal device in the another communication system.

2. Access Network Device

In addition, the access network device in this embodiment of this application may be a device configured to communicate with a terminal device. The access network device may also be referred to as an access network device or a radio access network device. For example, the access network device may be an evolved NodeB (eNB, or eNodeB) in an LTE system, or may be a radio controller in a cloud radio access network (CRAN) scenario, or the access network device may be a relay station, an access point, an in-vehicle device, a wearable device, an access network device in a 5G network or an access network device in a future evolved PLMN network, and the like, may be an access point (AP) in a WLAN, or may be a gNB in a new radio (NR) system, a device that assumes a base station function in device-to-device (D2D), vehicle-to-everything (V2X), machine-to-machine (M2M) communication, and the like. This is not limited in this embodiment of the present application.

In addition, in this embodiment of this application, the access network device is a device in a RAN, or is a RAN node that connects a terminal device to a wireless network. For example, by way of example rather than limitation, examples of the access network device may be listed as follows: a gNB, a transmission reception point (TRP), an evolved NodeB (eNB), a radio network controller (RNC), a NodeB (NB), a base station controller (BSC), a base transceiver station (BTS), a home base station (for example, home evolved NodeB, or home NodeB, HNB), a base band unit (BBU), a wireless fidelity (Wi-Fi) access point (AP), and the like. In a network structure, a network device may include a centralized unit (CU) node, a distributed unit (DU) node, a RAN device including a CU node and a DU node, or a RAN device including a control plane CU node (CU-CP node), a user plane CU node (CU-UP node), and a DU node.

The access network device provides a service for a cell. The terminal device communicates with the access network device by using a transmission resource (for example, a frequency domain resource or a spectrum resource) used by the cell. The cell may be a cell corresponding to the access network device (for example, a base station). The cell may belong to a macro base station or may belong to a base station corresponding to a small cell. The small cell herein may include a metro cell, a micro cell, a pico cell, a femto cell, and the like. These small cells have features of small coverage and low transmission power, and are applicable to providing a high-rate data transmission service.

In addition, a plurality of cells may simultaneously work at a same frequency on a carrier in an LTE system or a 5G system. In some special scenarios, it may be considered that the carrier and the cell are equivalent in concept. For example, in a carrier aggregation (CA) scenario, when a secondary component carrier is configured for UE, a carrier index of the secondary component carrier and a cell identifier (Cell ID) of a secondary cell operating on the secondary component carrier are carried.

The communication system in this application may be further applicable to a vehicle to everything (V2X) technology. In other words, the terminal device in this application may be alternatively a vehicle, for example, a smart vehicle or a self-driving vehicle.

"X" in the V2X represents different communication targets, and the V2X may include but is not limited to: vehicle to vehicle (V2V), vehicle to infrastructure (V2I), vehicle to network (V2N), and vehicle to pedestrian (V2P).

In the V2X, the access network device may configure a "zone" for the UE. The zone may also be referred to as a geographic zone. After the zone is configured, the world is divided into a plurality of zones, and the zones are defined by reference points, lengths, and widths. When determining a zone identifier (ID), the UE performs a reminder operation by using the length and the width of the zone, a quantity of zones in the length, a quantity of zones in the width, and the reference point. The foregoing information may be configured by the access network device.

3. Access Management Function Entity

The access management function entity is mainly configured to perform mobility management, access management, and the like, and may be configured to implement functions, for example, functions such as lawful interception and access authorization/authentication, other than session management in mobility management entity (MME) functions in the LTE system.

In a 5G communication system, the access management network element may be an access management function (AMF) entity.

In a future communication system, the access management function entity may still be an AMF entity, or may have another name. This is not limited in this application.

4. Session Management Function Entity

The session management function (SMF) entity is mainly configured to manage a session, allocate and manage an internet protocol (IP) address of a terminal device, select a manageable user plane function, select a termination point of policy control and charging function interface, and perform downlink data notification, and the like.

In a future communication system, the session management network element may still be the SMF entity, or may have another name. This is not limited in this application.

5. Application Function Entity

The application function (AF) entity is configured to perform data routing affected by an application, access a network capability exposure function entity, interact with a policy framework to perform policy control, and the like.

In a future communication system, the application function entity may still be the AF entity, or may have another name. This is not limited in this application.

6. User Plane Function Entity

The user plane function (UPF) entity is configured to perform packet routing and forwarding, quality of service (QoS) processing of user plane data, and the like.

In a future communication system, the user plane function entity may still be the UPF entity, or may have another name. This is not limited in this application.

7. Data Network

The data network (DN) is configured to provide a network for transmitting data.

8. Policy Control Function Entity

The policy control function (PCF) entity supports a unified policy framework to manage network behavior, provides a policy rule for a network entity to execute, and accesses subscription information of a unified data repository (UDR).

9. Network Data Analytics Function Entity

A network data analytics function (NWDAF) entity is used to analyze network slice-related data. The analysis may be extended to analysis of various types of network data, including network operation data collected from a network function, statistics data that is related to a terminal device and a network and collected from an operation administration and maintenance (OAM) management system, and application data obtained from a third-party application. An analysis result generated by the NWDAF may also be output to the network function, the OAM, or the third-party application.

It should be noted that the "entity" may also be referred to as a network element, a device, an apparatus, a module, or the like. This is not particularly limited in this application. In addition, in this application, for ease of understanding and description, a description of the "entity" is omitted from some descriptions. For example, the SMF entity is referred to as SMF. In this case, "SMF" should be understood as an SMF network element or the SMF entity. A description of the same case or a similar case is omitted below.

It may be understood that the foregoing entity or function may be a network element in a hardware device, may be a software function running on dedicated hardware, or may be a virtualization function instantiated on a platform (for example, a cloud platform).

It should be understood that the above listed network elements or entities included in the communication system are merely an example for description. This is not particularly limited in this application.

In this application, the initiating network element shown in FIG. 1 may be configured in or may be any network element in the network elements shown in FIG. 3, for example, the terminal device, the access network device, the access management function entity, or the measurement control function entity. This is not limited in this application.

Similarly, the processing network element shown in FIG. 1 may be configured in or may be any network element in the network elements shown in FIG. 3, or an entity or network element configured to implement a function of the processing network element shown in FIG. 1 is independently disposed in the system shown in FIG. 3.

Similarly, the storage network element shown in FIG. 1 may be configured in or may be any network element in the network elements shown in FIG. 3, or an entity or network element configured to implement a function of the storage network element shown in FIG. 1 is independently disposed in the system shown in FIG. 3.

Figure 4:
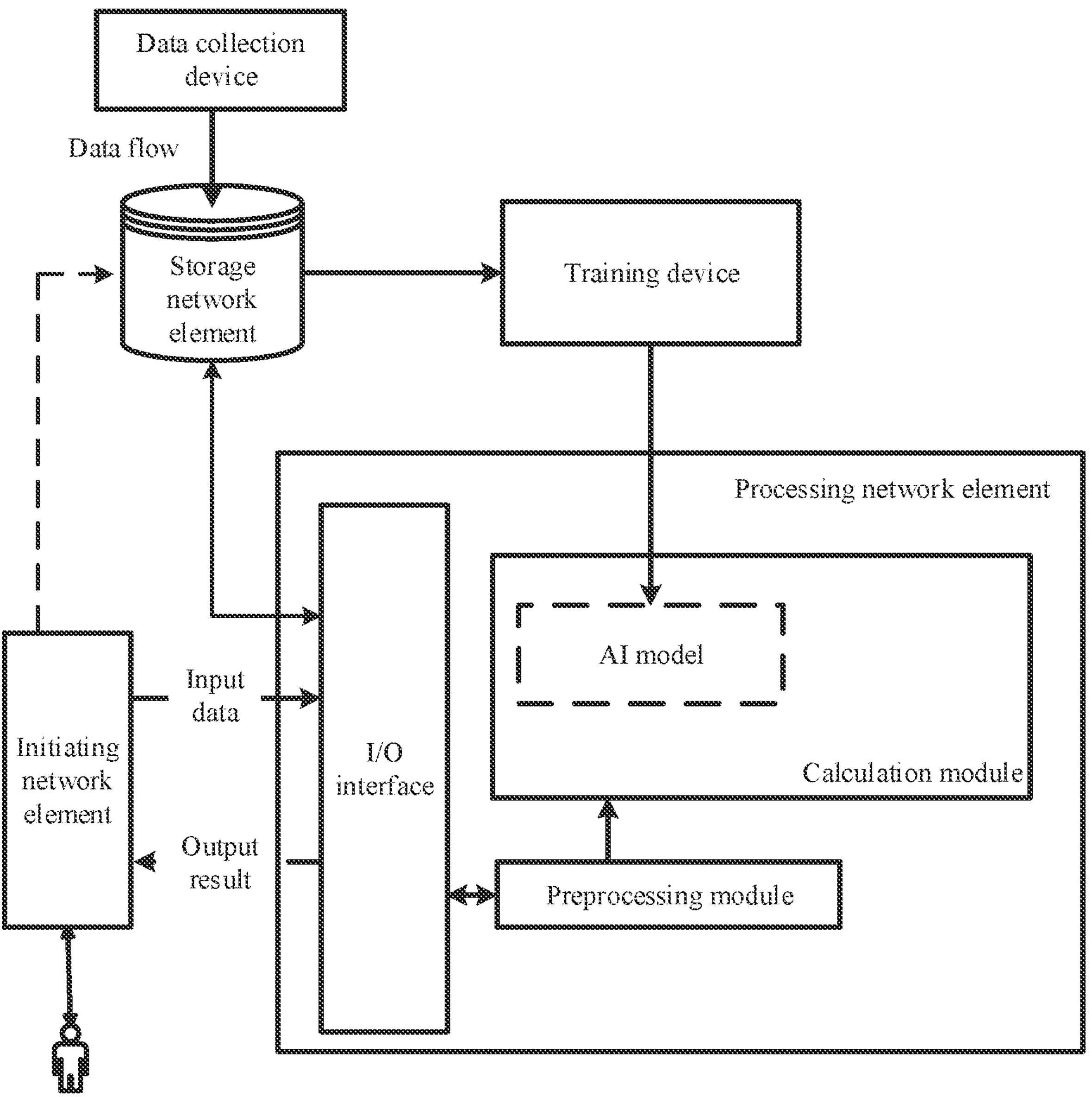
FIG. 4 is a schematic diagram of an architecture of still another example of a communication system according to this application.
Figure 5:
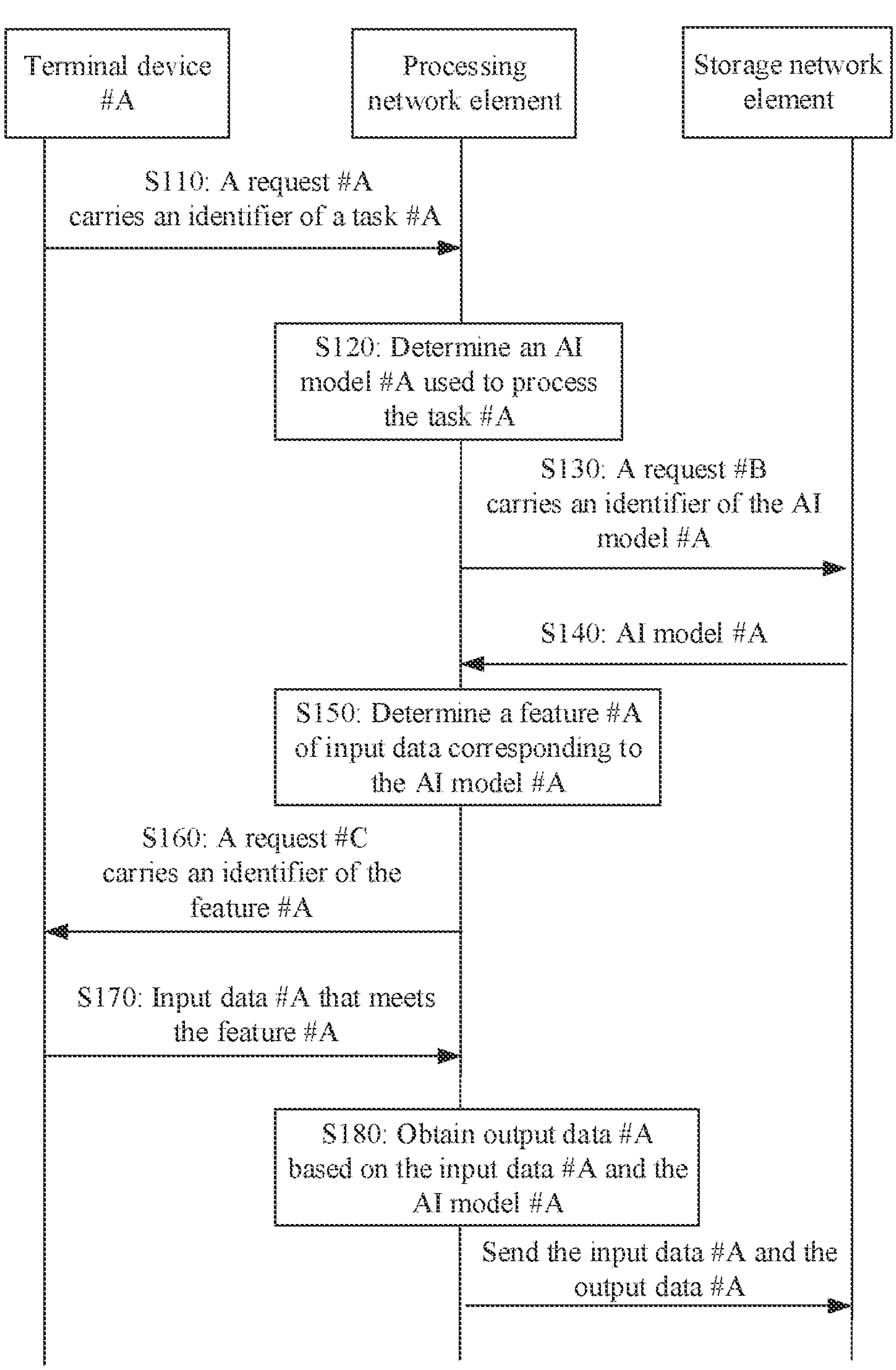
FIG. 5 is a schematic diagram of interaction in another example of a communication process according to this application.

The following describes training and use methods of the AI model in this application with reference to FIG. 4 and FIG. 5.

For ease of understanding, the following first describes related concepts such as related terms and AI models in the embodiments of this application. The AI models in this application may include but are not limited to a neural network model, a convolutional neural network model, and the like.

(1) Neural Network

The neural network may be formed by a neural unit. The neural unit may be an operation unit that uses $x_s$ and an intercept 1 as an input. An output of the operation unit may be:

$$h_{W,b}(x) = f\left(W^T x\right) = f\left(\sum_{s=1}^{n} W_s x_s + b\right)$$

s=1, 2, . . . , n, where n is a natural number greater than 1, $W_s$ is a weight of $x_s$, and b is a bias of the neural unit. f is an activation function of the neural unit, which is used to introduce a nonlinear characteristic into the neural network to convert an input signal in the neural unit into an output signal. The output signal of the activation function may be used as an input of a next-layer convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Convolutional Neural Network

The convolutional neural network is a type of deep neural network with a convolutional structure. The convolutional neural network includes a feature extractor including a convolutional layer and a sampling sublayer. The feature extractor may be considered as a filter. A convolution process may be considered as using a trainable filter to perform convolution on an input image or a convolutional feature plane (feature map). The convolutional layer is a neuron layer that is in the convolutional neural network and at which convolution processing is performed on an input signal. In the convolutional layer of the convolutional neural network, a neuron may be connected to only a part of adjacent neurons. One convolutional layer usually includes several feature planes. Each of the feature planes may include several rectangular neural units. Neural units of a same feature plane share a weight, and the shared weight herein is a convolution kernel. The shared weight may be understood as that a manner of extracting image information is independent of a position. An implicit principle of this is that statistical information of a particular part of an image is the same as that of another part. This means that image information learned in the particular part may also be used in the another part. Therefore, the same image information obtained through learning may be used for all positions on the image. In the same convolutional layer, a plurality of convolution kernels may be used to extract different image information. Usually, more convolution kernels indicate more image information reflected by a convolution operation.

The convolution kernel may be initialized in a form of a matrix of a random size, and the convolution kernel may obtain an appropriate weight through learning in a training process of the convolutional neural network. In addition, an immediate benefit of the shared weight is to reduce connections between layers of the convolutional neural network, while reducing a risk of overfitting.

(3) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

The following describes an AI model, applicable to a communication system, used in this application.

By way of example rather than limitation, AI model-based decision-making in this application may include but is not limited to decision-making related to a physical layer air interface and decision-making for network optimization and management. Decision-making performed on a physical layer based on the AI model to improve physical layer performance has a high requirement on real-time performance. Decision-making for the network optimization and management based on the AI model can change processing of an event performed by a communication network from reactive to proactive, and reduce a real-time requirement on the processing, thereby improving performance of a communication system.

In this application, the AI model may be obtained by training based on machine learning or deep learning. When based on deep learning, the AI model may refer to a network that has an input layer and an output layer and has at least one hidden layer between the input layer and the output layer. Behind the hidden layer, there may be nonlinear activation function processing, such as an activation function (rectified linear unit, ReLU) and a hyperbolic tangent function (tan h). A connection between layers includes nodes connected to each other on the layers, and a pair of connected nodes has a weight value and a bias value. The deep neural network may be viewed as a non-linear transformation of input to output. The output may be further input into a loss function to calculate a loss, and a gradient generated by calculation may be transmitted from the output layer to the input layer by using the back-propagation algorithm to update weights and biases of the layers, so that losses are minimized. The AI model may be alternatively obtained based on deep reinforcement learning. The deep reinforcement learning is a combination of the deep neural network and the deep learning. The reinforcement learning is a process in which an agent interacts with an environment to learn an optimal policy through trial and error (or exploration). The reinforcement learning may provide solutions to problems with a series of decisions, especially problems that cannot be theoretically modeled or are difficult to resolve. A reinforcement learning system may further include the following concepts: a state (or observation), a policy, a reward, a time step, a round, and a value function. The policy decides an action that the agent may take in a case of a given state, that is, mapping from the state to the action. In the deep reinforcement learning, the observation may be an input of the deep neural network and the action corresponds to an output of the deep neural network. The reward is a value fed back by a current environment after the agent takes a specific action in the environment. At each time step, the agent takes a specific action, and then the environment feeds back a reward value. Problems that usually exist are not problems that can be resolved by optimizing a single action. Instead, a series of decisions are optimized to obtain a final result or a comprehensive result. Therefore, in a process of resolving a specific problem to achieve optimization in the reinforcement learning, the round may be used as a unit, and each round includes a plurality of time steps. The environment may feed back a reward only at a time step at which the round ends. In this case, rewards at previous time steps may be replaced with zero. Certainly, the environment may alternatively feed back a non-zero reward before the round ends. Different environments adopt different feed back manners. According to the reward fed back by the environment, the agent aims at maximizing a total reward of each round. The value function is also a type of mapping, and an input thereof may be a state, or may be a collection of states and actions. An output is a value. The value is a value that is estimated by the agent and that is of a total reward that can be accumulated in the future. A larger value indicates a better currently selected action in the long run. In the deep reinforcement learning, the value function may be alternatively represented by the deep neural network. The input of the value function is the input of the deep neural network, and the output of the value function is the output of the deep neural network.

Alternatively, the AI model may be obtained based on training through reinforcement learning, and may be used to explore a small range of feasible configurations of the system to automatically improve system performance. The improvement of the system performance may be long-term and is enabled by a system parameter configuration dominated by the reinforcement learning.

For example, a current handover parameter of the system is used as the input, and the handover parameter may include a handover offset, a handover amplitude hysteresis, a handover time hysteresis, and the like. The output is to increase or decrease the handover parameter, that is, to adjust a difficulty degree of handover. When being increased or decreased, the step length may be set far less than an absolute value of an original parameter, so that system setting does not deviate too much, to prevent the system performance from deteriorating too much. The network performance is an effect obtained after a network decision is taken, and corresponds to the reward in the reinforcement learning. The reward may be set to good or bad of the handover within a period of time. That is because the handover may become better or worse due to adjustment of the handover parameter of the system. With this feedback, the AI model may be used to explore for more network decisions that can make the handover better. For example, the handover time hysteresis in the current handover parameter of the system is 320 milliseconds, the output of the AI model is to increase the handover time hysteresis, the communication system receives the output of the AI model and automatically adjusts the handover time hysteresis in the system to be 325 milliseconds. After a period of time, statistics are collected on 1000 times of handover after the hysteresis parameter is changed. The statistics show that 800 times of handover succeed, 180 times of handover are performed at inappropriate handover opportunities, and 20 times of handover fail. In this case, the reward may be designed as follows: Reward=a quantity of times of handover that succeeds−a quantity of times of handover performed at inappropriate handover opportunities−a quantity of times of handover that fails*10=800−180−200=420. After the AI model obtains a feedback of a network decision made this time, it means that sampling (sample) is completed once, and next time of exploration may start. The AI model may be used to simultaneously explore a plurality of cells and collect samples from the plurality of cells, to accelerate a convergence speed of the AI model. In this example, there is only the handover parameter used as the input of the AI model. The AI model obtained in this way is the same for all cells. Actually, cells should be differentiated, that is, cell-related additional information, for example, information extracted from a historical cell handover report and a UE measurement report, should be added to the input of the AI model.

For another example, a current cell selection, reselection, and handover parameter of the system are used as the input, and the handover parameter may include a handover offset, a handover amplitude hysteresis, and a handover time hysteresis. The output is to increase or decrease these parameters, that is, to adjust a difficulty degree of a user to camp on a cell. When being increased or decreased, the step length may be set far less than an absolute value of an original parameter, so that system setting does not deviate too much, to prevent the system performance from deteriorating too much. The network performance is an effect obtained after a network decision is taken, and corresponds to the reward in the reinforcement learning. The reward may be set to good or bad of the handover within a period of time. That is because a load status may become better or worse due to adjustment of the system parameter. With this feedback, the AI model may be used to explore for more network decisions that can make load better. For example, the handover time hysteresis in the current handover parameter of the system is 320 milliseconds, the output of the AI model is to increase the handover time hysteresis, the communication system receives the output of the AI model and automatically adjusts the handover time hysteresis in the system to be 325 milliseconds. After a period of time, statistics are collected on load statuses of a few surrounding cells. The reward may be designed as follows: Reward=0−a variance of load values of the few cells. A larger variance indicates more unbalanced load of the few cells. A smaller variance indicates more balanced load of the few cells. The reinforcement learning tends to increase the reward, that is, decrease the variance. This enables the load of the few cells to be more balanced, and each cell may focus only on a few cells near the cell. After the AI model obtains a feedback of a network decision made this time, it means that sampling is completed once, and next time of exploration may start. The AI model may be used to simultaneously explore a plurality of cells and collect samples from the plurality of cells, to accelerate a convergence speed of the AI model.

For another example, an MDT report is used as the input. The output is to increase or decrease coverage. The network performance is an effect obtained after the network decision is taken, and corresponds to the reward in the reinforcement learning. The reward may be set to the system performance in a period of time. That is because the performance may be improved or reduced due to adjustment of the system coverage. With this feedback, the AI model may be used to explore for more network decisions that can make the system better. For example, an electronic down tilt of a cell is 3 degrees. The down tilt is adjusted to 3.5 degrees after coverage of a specific area is found to be weak. After a period of time, statistics are collected on coverage-related indicators, such as a pack loss rate and a signal to interference plus noise ratio, of a few surrounding cells. The reward may be designed as follows: Reward=a maximum value of signal to interference plus noise ratios of the few cells at this location. A larger value of the reward indicates a more definite cell to which the UE belongs at this location. In this case, interference is smaller, and coverage optimization is the best. The reinforcement learning tends to increase the reward. This enables coverage of the few cells to be more optimal, and each cell may focus only on a neighboring cell at a location of the cell.

For another example, energy efficiency information is used as the input. The output is to disable or enable a cell. The network performance is an effect obtained after the network decision is taken, and corresponds to the reward in the reinforcement learning. The reward may be set to system performance within a period of time. That is because energy efficiency of a surrounding area of the cell may be improved or reduced due to the enabling or disabling of the cell. With this feedback, the AI model may be used to explore for more network decisions that can make the system better. For example, load and energy efficiency of a specific cell and surrounding cells are input into the AI model. The AI model outputs a network decision indicating to disable the cell or reduce maximum downlink transmit power of the cell. After a period of time, statistics are collected on energy efficiency-related indicators of the cell and a few surrounding cells. The reward may be designed as follows: Reward=energy efficiency of the surrounding cells. A larger value of the reward indicates a more correct network decision. The reinforcement learning tends to increase the reward. This maximizes the energy efficiency of the few cells, and each cell may focus only on a neighboring cell, of the cell, at this location.

For another example, random access efficiency information is used as the input. The output is to increase or decrease a random access threshold. The network performance is an effect obtained after the network decision is taken, and corresponds to the reward in the reinforcement learning. The reward may be set to system performance within a period of time. That is because random access efficiency of a surrounding area of the cell may be improved or reduced due to a change of a random access parameter. With this feedback, the AI model may be used to explore for more network decisions that can make the system better. For example, random access efficiency of a specific cell and surrounding cells is input into the AI model. The AI model outputs a network decision indicating to adjust the random access parameter. After a period of time, statistics are collected on random access efficiency-related indicators of the cell and a few surrounding cells. The reward may be designed as follows: Reward=random access efficiency of the surrounding cells. A larger value of the reward indicates a more correct network decision. The reinforcement learning tends to increase the reward. This maximizes the random access efficiency of a few cells, and each cell may focus only on a neighboring cell, of the cell, at this location.

In this application, the AI model processes the input data, to further obtain the output data, that is, an inference result for the decision-making.

The AI model may be pre-trained, that is, the input data may be irrelevant to the AI model, and is merely an observation on the network. Alternatively, the input data may be used in an AI model update (or training) process, that is, the input data may be alternatively related to the AI model. The AI model outputs a decision, to cause a change of the network status, and further cause a change of the input data. In this case, the input data may form a correspondence with the output of the AI model, to assist the AI model that is based on the reinforcement learning.

In an implementation, the input data may be alternatively preprocessed before being input into the AI model. The preprocessing may be any necessary signal processing operations such as splitting, combination, transformation, discretization, fast Fourier transform (FFT) or inverse fast Fourier transform (IFFT), normalization, outlier processing, redundant value processing, vacancy value processing, dimension increase or decrease, data augmentation, and the like.

The following describes the input data.

In this application, the input data may be terminal device-related data, for example, include but is not limited to one or more types of the following data:

radio resource control (RRC) signaling, a call setup success rate, a radio frequency link failure indication, an access failure rate, a handover failure rate, a call success rate, a handover success rate, a call drop rate, voice quality, a session success rate, service setup time, a session drop rate, data flow quality, a jitter, a delay, a throughput, a service rate, a service rate requirement, quality of service, user experience quality, and a random access report.

For another example, the input data may be cell-related data, for example, include but is not limited to one or more types of the following data:

physical resource block (PRB) utilization, a quantity of active users, a random access quantity, a cell type, a transmit power class, a quantity of available resources, cell load, a traffic type, a cell location, cell power consumption, a cell capacity, and cell energy efficiency.

For another example, the input data may be channel-related data, for example, include but is not limited to one or more types of the following data:

a measurement report of a primary serving cell, a measurement report of a neighboring cell, channel power, interference power, noise power, a channel quality indicator, reference signal received power, reference signal received quality, a received signal strength indicator, a signal to interference plus noise ratio, a minimization of drive tests (MDT) report, a channel complex value, a channel value real part, a channel value imaginary part, a channel power delay spectrum, a channel angle power spectrum, a channel multipath angle of arrival, a channel multipath angle of departure, a channel multipath pitch of arrival, and a channel multipath pitch of departure.

For another example, the input data may be a user behavior profile of a terminal device, for example, include but is not limited to one or more types of the following data:

environment (context) information, location distribution, mobility, weather, time, configuration of a terminal device, a model of the terminal device, configuration of a physical layer of the terminal device, average transmit power, power of the terminal device, a service type, an average delay, an average packet loss rate, an amount of transmitted and received data, a historical access cell, an international mobile subscriber identity, a device identifier, a user experience-related indicator, and an event report.

For another example, the input data may be communication network-related data, for example, include but is not limited to one or more types of the following data:

a historical alarm log, a device configuration log, a device log, a resource utilization record, a network performance monitoring record, link availability, a call drop rate, a throughput, a network element interface-related indicator, authentication information, a crowd gathering heat map, a crowd movement trajectory, a crowd density, notification area-related signaling overheads, power consumption, and cell coverage.

For another example, the input data may be application-related data of a terminal device, for example, authorization information of an application layer, information collected by a sensor, a call record, a financial condition, social media information, and a requirement of an application on a data rate.

For another example, the input data may be data stored in the NWDAF.

The following describes the output data (or the inference result).

For example, the output data may be an input data-related predicted value for the future, for example, the predicted value may be a predicted value of a network status or network performance, so that the communication system may correspondingly adjust the network based on the predicted value. The predicted value may include a list including predicted values for various types of network statuses or performance, such as simultaneously predicting channel strength of an I path and channel strength of a Q path.

For another example, the output data may be an input data-related policy. The policy is a decision, for example, how to hand over to an idle base station when network load is high, whether handover is performed under a particular channel condition, and how to select an antenna, that should be made in a particular network state (for example, a network state corresponding to the input data). The policy may include a decision list and corresponds to decisions that may be made in a particular network state. The policy may include a decision list and a probability of each type of decision. The communication device may obtain a decision or a combination of several types of decisions through sampling in accordance with the probability based on the probability decision in the policy.

For another example, the output data may be an input data-related setting (or configuration). The setting refers to an update, for example, setting a threshold for setting an event, setting of an encoding bit rate, and setting of a codec, of an existing parameter or module in the communication system.

In an implementation, the AI model in this application may be used to output a probability of each of a plurality of possible results (which is specifically a probability of each result in the case of the input data entered).

For example, when the processing task is mobility robust optimization, a possible result includes but is not limited to one or more of the following handover results: successful handover, premature handover, delayed handover, handover to an incorrect cell, unnecessary handover, ping-pong handover, and the like.

For another example, when the processing task is load balancing optimization, a possible result includes but is not limited to one or more of the following load results: load exceeds a preset threshold and load does not exceed a preset threshold.

For another example, when the processing task is coverage optimization, a possible result includes but is not limited to one or more of the following coverage results: coverage is less than a preset range, and coverage is greater than or equal to a preset range.

The following describes training and use processes of the AI model in this application.

First, an architecture of an AI model training system provided in this embodiment of this application is described. As shown in FIG. 4, a data collection device (for example, a terminal device, an access network device, or a core network device that stores user information) is configured to collect training data.

In this application, the training data may include input training data and a decision result corresponding to the input training data.

Content and a source of the input training data may be similar to the input data described above. To avoid repetition, detailed description thereof is omitted herein. The decision result may be a result of running of a communication system in the case of the input training data. For example, the decision result may be obtained in a manner of experiment, statistics, or the like.

In addition, the data collection device stores the training data into a storage network element, and a training device obtains an AI model through training based on the training data maintained in the storage network element.

In this application, the training device may be configured on or may be the processing network element, the storage network element, or the third-party device described above. This is not particularly limited in this application.

In addition, the data collection device may be configured on or may be the initiating network element, the processing network element, the storage network element, or the third-party device described above. This is not particularly limited in this application.

In addition, the storage network element may be configured on or may be the processing network element, the storage network element, or the third-party device described above. This is not particularly limited in this application.

It should be noted that, in actual application, the training data maintained in the storage network element is not necessarily collected by the data collection device, but may also be obtained by being received from another device. It should be additionally noted that the training device does not necessarily perform AI model training entirely based on the training data maintained by the storage network element, but may also perform model training by obtaining training data from a cloud or another place. The foregoing description should not be used as a limitation to this embodiment of this application.

The AI model obtained through training by the training device may be applied to the processing network element.

As shown in FIG. 4, the processing network element is configured with an input or output (I/O) interface, configured to perform data interaction with the initiating network element, and the initiating network element sends input data to the I/O interface.

A preprocessing module is configured to preprocess the input data received through the I/O interface. A preprocessing process and method may be similar to those in the conventional technology. To avoid repetition, detailed description thereof is omitted herein. It should be noted that, in this application, preprocessing may not be performed on the input data. In this case, the system shown in FIG. 4 may also not include the preprocessing module.

A calculation module is configured to perform, based on the AI model, related processing such as calculation on the input data from the preprocessing module or the I/O interface, to obtain output data.

It should be noted that, the processing network element may invoke data, code, and the like in a data storage network element for corresponding processing, and may further store data, instructions, and the like obtained through the corresponding processing into the storage network element.

Finally, the I/O interface returns a processing result, such as the output data obtained above, to the initiating network element.

In the case shown in FIG. 4, a user may manually give the input data, which may be operated through an interface provided by the I/O interface. In another case, the initiating network element may automatically send the input data to the I/O interface. If authorization of the user is required to be obtained for the initiating network element to automatically send the input data, the user may set corresponding permission in the initiating network element. The user may view, on the initiating network element, a result output by the processing network element. A specific presentation form may be a specific manner such as display, a sound, or an action. The initiating network element may also serve as a data collection end, to collect, as new sample data, the input data input through the I/O interface and the output data output through the I/O interface shown in FIG. 4, and store the new sample data into the storage network element. Certainly, collection may not be performed by the initiating network element. Instead, the input data input through the I/O interface and the output data output through the I/O interface shown in FIG. 4 are directly stored, as new training data, into the storage network element through the I/O interface.

It should be noted that FIG. 4 is only a schematic diagram of a system architecture according to an embodiment of this application. Location relationships between devices, components, and modules shown in the figure do not constitute any limitation. For example, in FIG. 4, the storage network element is independently configured relative to the processing network element. In another case, the storage network element and the processing network element may be alternatively configured in a same entity.

FIG. 5 shows an interaction process performed when a terminal device (denoted as terminal device #A) serves as an initiating device to initiate a particular task (denoted as task #A) to a processing network element (for example, an access network device of a serving cell of the terminal device #A, or a core network device of a network in which the terminal device #A is located, for example, a core network device integrated with a processing network element function or a core network device independently configured to implement a processing network element function).

As shown in FIG. 5, in an implementation, in S110, the terminal device #A (that is, an example of the initiating network element) sends a request #A to the processing network element, and correspondingly, the processing network element receives the request #A sent by the terminal device #A. The request #A is used to request to perform inference processing, on the task #A, for the terminal device #A. For example, the request #A may include an identifier of the task #A. Optionally, the request #A may further include an identifier of the terminal device #A.

It should be noted that, when the processing network element is configured on or is an access network device, the terminal device may send the request #A through an access stratum (AS) message. When the processing network element is configured on or is a core network device, the terminal device may send the request #A through a non-access stratum (NAS) message.

In another possible implementation, the initiating network element may further actively (for example, periodically or in an event-triggered manner) perform the task #A for the terminal device #A based on, for example, subscription information of the terminal device #A.

In S120, the processing network element may determine an AI model (denoted as AI model #A) used to perform the task #A.

In an implementation, in S130, the processing network element may send a request #B to the storage network element, and correspondingly, the storage network element receives the request #B sent by the processing network element, where the request #B is used to request to obtain the AI model #A. For example, the request #B may include an identifier of the AI model #A. In S140, the storage network element sends the AI model #A to the processing network element, and correspondingly, the processing network element receives the AI model #A sent by the storage network element.

In another implementation, the processing network element may store a plurality of AI models, so that the processing network element may determine the AI model #A from the plurality of stored AI models based on the identifier of the AI model #A.

In S150, the processing network element determines a feature (denoted as feature #A) of input data (denoted as input data #A) corresponding to the AI model #A.

By way of example rather than limitation, the feature #A may include, but is not limited to, one or more of the following features:

a type (or a class or a name) of the input data #A, a data format of the input data #A, a data quantity of the input data #A, a data size of the input data #A, and the like.

By way of example rather than limitation, when the task model #A is obtained based on a reinforcement learning manner, the input data includes input status data and input reward data.

When the task model #A is obtained based on a non-reinforcement learning manner, the input data includes input status data.

In a possible implementation, when the input data #A is stored in the terminal device #A, in S160, the processing network element sends a request #C to the terminal device #A, where the request #C is used to request to obtain data (namely, the input data #A) corresponding to the feature #A, for example, the request #C may include an identifier of the feature #A. In S170, the terminal device #A determines data (namely, the input data #A) that meets the feature #A, and sends the data to the processing network element.

In another possible implementation, when the input data #A is stored in the network device (for example, an access network device or a core network device), the processing network element sends a request #C' to the network device, where the request #C' is used to request to obtain data (namely, the input data #A) corresponding to the feature #A, for example, the request #C' may include an identifier of the feature #A and the identifier of the terminal device #A. For example, when the processing network element is the access network device and the network device is the core network device, the request #C' may be transmitted through a communication interface (for example, an NG interface) between the access network device and the core network device.

In still another possible implementation, when some data in the input data #A is stored in the terminal device #A and the other data is stored in the network device (for example, an access network device or a core network device), the processing network element may separately obtain different parts of the input data #A from the terminal device #A and the network device.

In S180, the processing network element inputs the input data #A into the task model #A, and further obtains output data (dedicated as output data #A), that is, a result of the task #A in a state corresponding to the input data #A.

In an implementation, when the processing network element is configured in or is a network element that can perform corresponding processing based on the output data #A, the processing network element may perform corresponding processing based on the output data #A.

In another implementation, the processing network element may send the output data #A to a network element that can perform corresponding processing based on the output data #A.

In still another implementation, the processing network element may send the output data #A to the terminal device #A, and the terminal device #A performs corresponding processing based on the output data #A, or the terminal device #A may send the output data #A to a network element that can perform corresponding processing based on the output data #A.

In addition, the processing network element or the terminal device #A may further send, as a group of training data, the input data #A and the output data #A to a network element (for example, a storage network element) configured to train the AI model, so that task processing and training data collection can be combined, thereby further improving practicability of this application.

Figure 6:
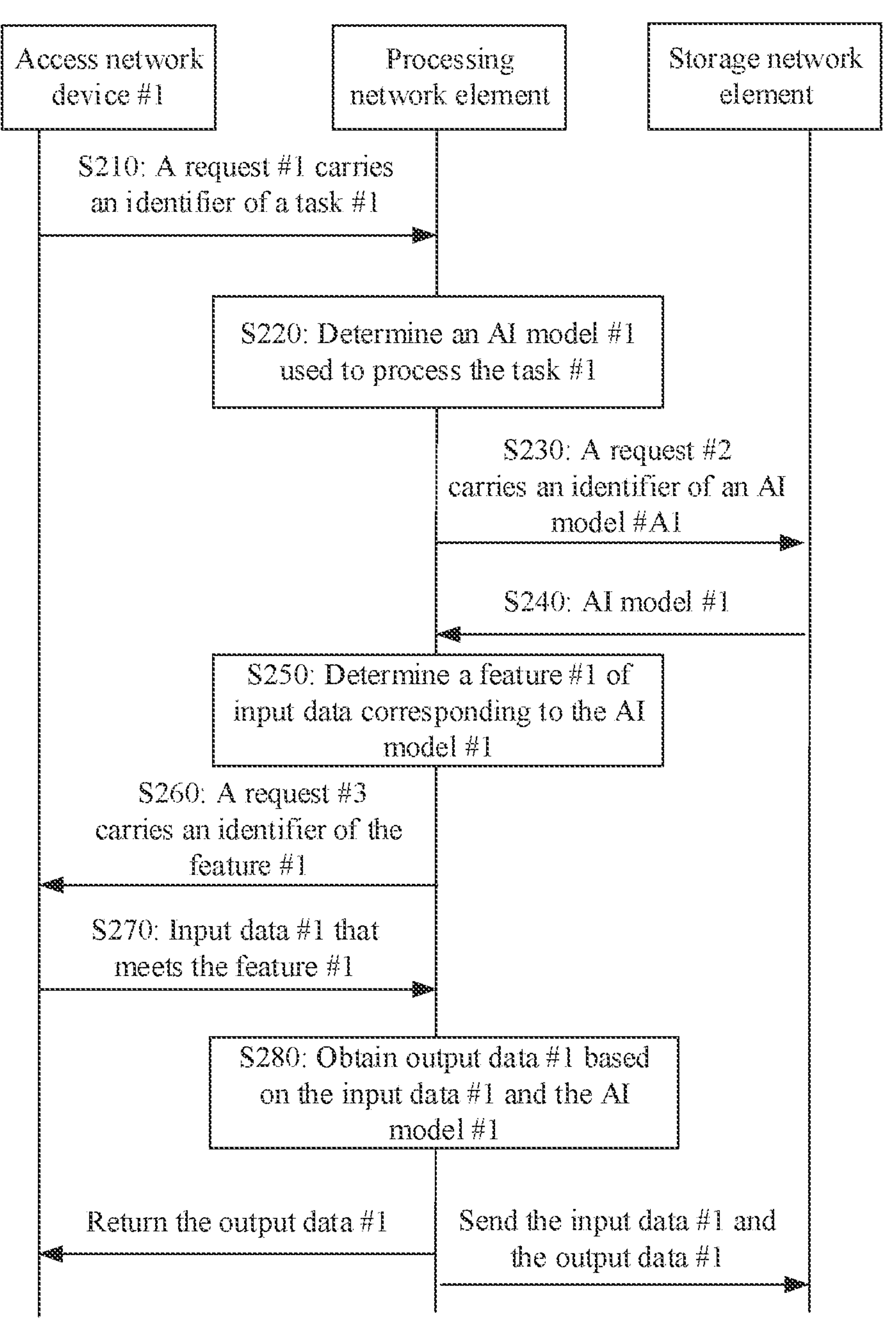
FIG. 6 is a schematic diagram of interaction in still another example of a communication process according to this application.

FIG. 6 shows an interaction process performed when an access network device (denoted as access network device #1) serves as an initiating device to initiate a task (denoted as task #1) to a processing network element (for example, a core network device of a network in which the access network device #1 is located, for example, a core network device integrated with a processing network element function or a core network device independently configured to implement a processing network element function).

As shown in FIG. 6, in a possible implementation, in S210, the access network device #1 in a plurality of cells sends a request #1 to the processing network element, and correspondingly, the network element receives the request #1 sent by the access network device #1. The request #1 is used to request to perform inference processing on the task #1. For example, the request #1 may include an identifier of the task #1.

Optionally, the request #1 may further include identifiers of a plurality of terminal devices (for example, a plurality of terminal devices in a cell of the access device #1) related to the task #1.

In another possible implementation, the initiating network element may further actively (for example, periodically or in an event-triggered manner) perform the task #1 for the plurality of cells.

In S220, the processing network element may determine an AI model (denoted as AI model #1) used to perform the task #1.

In an implementation, in S230, the processing network element may send a request #2 to the storage network element, and correspondingly, the storage network element receives the request #2 sent by the processing network element, where the request #2 is used to request to obtain the AI model #1, for example, the request #2 may include an identifier of the AI model #1. In S240, the storage network element sends the AI model #1 to the processing network element.

In another implementation, the processing network element may store a plurality of AI models, so that the processing network element may determine the AI model #1 in the plurality of stored AI models based on the identifier of the AI model #1.

In S250, the processing network element determines a feature (denoted as feature #1) of input data (denoted as input data #1) corresponding to the AI model #1.

By way of example rather than limitation, the feature #1 may include but is not limited to one or more of the following features:

a type (or a class or a name) of the input data #1, a data format of the input data #1, a data quantity of the input data #1, a data size of the input data #A, and the like.

By way of example rather than limitation, when the task model #1 is obtained based on a reinforcement learning manner, the input data includes input status data and input reward data.

When the task model #A is obtained based on a non-reinforcement learning manner, the input data includes input status data.

In a possible implementation, when the input data #1 (for example, historical load of the cell) is stored in the access network device #1, in S260, the processing network element sends a request #3 to the access network device #1, and correspondingly, the access network device #1 receives the request #3 sent by the processing network element. The request #3 is used to request to obtain data (namely, the input data #1) corresponding to the feature #1. For example, the request #1 may include an identifier of the feature #1. In 270, the access network device #1 determines data (namely, the input data #1) that meets the feature #1, and sends the data to the processing network element.

In another possible implementation, when the input data #1 (for example, a user behavior profile) is stored in the core network device, the processing network element sends a request #3' to the core network device, and correspondingly, the core network device receives the request #3' sent by the processing network element. The request #3' is used to request to obtain data (namely, the input data #1) corresponding to the feature #1. For example, the request #3' may include an identifier of the feature #1 and an identifier of the terminal device #1.

In S280, the processing network element inputs the input data #1 into the task model #1, and further obtains output data (denoted as output data #1), that is, a result of the task #1 in a state corresponding to the input data #1.

In an implementation, when the processing network element is configured in or is a network element that can perform corresponding processing based on the output data #1, the processing network element may perform corresponding processing based on the output data #A.

In another implementation, the processing network element may send the output data #1 to a network element that can perform corresponding processing based on the output data #1.

In still another implementation, the processing network element may send the output data #1 to the access network device #1, and the access network device #1 performs corresponding processing based on the output data #1, or the access network device #1 may send the output data #1 to a network element that can perform corresponding processing based on the output data #1.

In addition, the processing network element or the terminal device #1 may further send, as a group of training data, the input data #1 and the output data #1 to a network element (for example, a storage network element) configured to train the AI model, so that task processing and training data collection can be combined, thereby further improving practicability of this application.

By way of example rather than limitation, the solution in this application may be applied to the following scenarios.

Scenario 1: Mobility Enhancement Optimization, for Example, Conditional Handover Optimization Specifically, to avoid a handover failure, an access network device of a target cell may reserve a resource for the terminal device, where the target cell may be a cell to be potentially accessed by a terminal device that is ready to perform cell handover. However, there is a risk of resource waste in this scenario. According to the solution in this application, the risk of resource waste can be effectively reduced.

The interaction process shown in FIG. 5 may be used in the scenario 1.

That is, in this case, the task #A may include a mobility enhancement optimization task for the terminal device #A.

In addition, input status data for the mobility enhancement optimization may include but is not limited to a measurement report of the terminal device #A and a user behavior profile of the terminal device #A.

Input reward data for the mobility enhancement optimization may include but is not limited to resource utilization of the terminal device #A.

In this case, the output data #A includes the result of the task #A in the state corresponding to the input data #A.

For example, the result may include a probability of each of a plurality of possible cell reserved resource quantities.

For another example, the result may include a recommended cell reserved resource quantity.

In addition, in this case, the processing based on the output data #A may include: reserving, by an access network device of the target cell to which the terminal device #A is to potentially access, a resource in the target cell #A for the terminal device #A based on the output data #A, where for example, a quantity of reserved resources may correspond to a quantity with a maximum probability in the output data #A.

Scenario 2: Access Mode Optimization, for Example, Two-Step Random Access Mode Optimization Specifically, a two-step random access mode is proposed compared with a conventional four-step random access mode, so that signaling overheads can be reduced. However, there is a competition risk in this scenario. According to the solution in this application, the competition risk can be estimated to provide an optimized access mode.

The interaction process shown in FIG. 5 may be used in the scenario 2.

That is, in this case, the task #A may include a two-step random access mode for the terminal device #A (for example, determining of a maximum quantity of times of two-step random access).

In the scenario 2, the input status data includes a measurement report of the terminal device, the input reward data includes a random access report of the terminal device, and the output data includes a quantity of times of two-step random access attempts of the terminal device.

Scenario 3: Radio Access Network Notification Area Optimization

Specifically, if a notification area of an access network for a particular terminal device is set excessive small, a large quantity of notification area update messages may be generated. If a notification area of an access network for a particular terminal device is set excessive large, a large quantity of paging messages may be generated. According to the solution in this application, appropriate setting of the notification area can be implemented.

The interaction process shown in FIG. 5 may be used in the scenario 3.

That is, in this case, the task #A may include an RNA determining process for the terminal device #A.

The input status data includes a user behavior profile of the terminal device #A and a location of a cell (denoted as cell #A) in which the terminal device #A is located, the input reward data includes overheads of signaling related to a communication area, and the output data includes a result of determining whether to set the cell #A as the notification area of the terminal device.

It should be noted that specific information or parameters included in the user behavior profile used in the scenario 3 and the user behavior profile used in the scenario 1 may be the same or different. This is not particularly limited in this application. The following omits descriptions of the same and similar cases.

Scenario 4: Radio Resource Management Policy Optimization of a Terminal Device

Specifically, by optimizing a radio resource management policy based on an AI model, a personalized service can be provided for a user, and requirements of different users can be flexibly met, to improve user experience.

The interaction process shown in FIG. 5 may be used in the scenario 4.

That is, in this case, the task #A may include a determining process of a radio resource management policy (for example, power control, channel allocation, scheduling, handover, access control, load control, end-to-end quality of service QoS, or adaptive coding modulation) for the terminal device #A.

In this case, the input status data includes a user behavior profile of a particular terminal device and a quantity of active users of a particular cell, the input reward data includes resource utilization of the terminal device, and the output data includes a probability that each of a plurality of radio resource management policies for the terminal device is used.

Scenario 5: Optimization of Matching Between an Application Layer of a Terminal Device and a Radio Access Network Specifically, the matching between an application layer of a terminal device and a radio access network is optimized based on an AI model, so that network utilization can be maximized, thereby improving network performance, and improving user experience.

The interaction process shown in FIG. 5 may be used in the scenario 5.

That is, in this case, the task #A may include a process of determining an application layer configuration parameter, for example, a transmission parameter, for the terminal device #A.

In the scenario 5, the input status data includes a user behavior profile of a particular terminal device, a rate (specifically, a transmission rate) requirement of a particular application installed on the terminal, the input reward data includes quality of service and experience quality of the terminal device (or a service corresponding to the application), and the output data includes a probability that each of a plurality of transmission rates (or adjustable transmission rates) corresponding to the application is used.

Scenario 6: Mobility Robustness Optimization (MRO) of a Terminal Device

Specifically, to avoid premature handover, delayed handover, handover to an incorrect cell, unnecessary handover, ping-pong handover, and the like, the solution in this application may be used for the MRO. That is, in a moving process of UE, handover between cells is inevitable. A handover occasion has great impact on user experience and network performance. The MRO may be used to assist in decision-making on the handover occasion, and may be further used to adjust a cell handover parameter. That is, there may be two types of AI outputs: One is a network decision related to a handover action and the other is a network decision related to a handover parameter.

When the AI model is used in supervised learning to improve the MRO, the training data includes a network status and a label. The network status herein may be a UE measurement report or handover-related historical information. The label indicates network performance obtained after the UE is handed over, and represents good or bad of the handover, which may be judgment on a handover result such as a handover success, premature handover, delayed handover, handover to an incorrect cell, unnecessary handover, and ping-pong handover. The judgment may be derived from analyzing a handover report or a radio frequency link failure indication after the handover, and the label may be obtained from a plurality of network-side nodes via an NG or S1 interface. The AI model may give, by learning a plurality of times of historical network status inputs and label outputs, a result caused by handover performed at this time in the case of a given real-time input, so that a system can avoid poor handover. This behavior of using AI to make real-time judgment may be referred to as drawing inferences. A process of non-real-time learning is referred to as training.

A subject of the training may be a network-side node, such as a base station, that has a handover parameter, or may be an independent network-side node. A subject of the drawing inferences may be a network-side node or UE. During the inference, an AI module outputs probabilities of six handover results. By analogy, an algorithm may be designed for a communication system and a final network decision is made based on an output of the AI module. When the AI module is used in reinforcement learning to improve the MRO, the input data is a network status and network performance, and the output is a network decision. When the reinforcement learning is used to enhance the communication system, a small range of feasible configurations of the system may be explored to automatically improve system performance. The improvement of the system performance may be long-time and is enabled by a system parameter configuration dominated by reinforcement learning.

The interaction process shown in FIG. 5 may be used in the scenario 6.

That is, in this case, the task #A may include a determining process of a mobility control policy (for example, a handover-related decision) for a terminal device #A.

In the scenario 6, the input status data includes a terminal device measurement report of a particular terminal device, the input reward data includes a handover report of the terminal device, and the output data includes a probability that each of a plurality of mobility policies (for example, cell selection, reselection, and handover) for the terminal device is used. In addition, a processing process in the scenario 6 is similar to the process shown in FIG. 5. To avoid repetition, detailed description thereof is omitted herein.

Scenario 7: Mobility Load Balancing (MLB) Optimization

Specifically, to evenly divide cell load, reduce manual intervention, improve user experience, improve a system throughput, save energy, and the like, the solution in this application may be used for the MLB, to assist in decision-making on a handover occasion, or may be used to adjust a cell selection, cell reselection, or handover parameter. That is, there are two types of outputs of an AI model: one is a network decision related to a handover action and the other is a network decision related to the cell selection, reselection, and handover parameter.

When the AI model is used in supervised learning to improve the MLB, training data includes a network status and a label. Herein, the network status may be load-related information. The label is predicted load-related information after a period of time. The load-related information includes load information of different levels, such as cell-level, beam-level, and hardware-level. Input load-related information may be information at a plurality of moments. An output is load-related information at a particular moment later than an input moment. The information is from historical information. In this case, the AI model may be used to predict load information at a future moment. In this way, after a piece of load information is input in real time, the AI model may obtain a future load status. After obtaining the future load status, a network-side node may accurately allocate a network parameter, to enable load on a node with low load in the future to increase and enable load on a node with high load in the future to decrease.

The load-related information used as the label may be a load value, or may be an indication indicating whether the load exceeds a threshold. As shown in the following table, there are only 0 and 1 for the label. Load-related information at a plurality of historical moments is input to the AI model. The AI model outputs a probability that future load exceeds the threshold. In this example, the probability that the load exceeds the threshold is 90%. In this case, after obtaining the inference result, the network-side node considers that the load is about to exceed the threshold. Exceeding the threshold means that some users may face congestion or even call drops. Therefore, the node adjusts a network parameter to make cell selection, reselection, and handover more difficult. The load is automatically distributed to another network node. By analogy, an algorithm may be designed for a communication system and a final network decision is made based on an output of the AI module.

When the AI module is used in reinforcement learning to improve the MLB, the input data is a network status and network performance, and the output data is a network decision. When the reinforcement learning is used to enhance the communication system, a small range of feasible configurations of the system may be explored to automatically improve system performance. The improvement of the system performance may be long-time and is enabled by a system parameter configuration dominated by reinforcement learning.

The interaction process shown in FIG. 6 may be used in the scenario 7.

That is, in this case, the task #1 may include a process of determining a load balancing policy for the access network device #1.

For example, the task #1 includes performing load balancing on a plurality of cells of the access network device #1.

Optionally, the request #1 may further include identifiers of terminal devices in the plurality of cells.

In addition, the input status data for the load balancing may include but is not limited to historical load of each of the plurality of cells and user behavior profiles of the terminal devices in the plurality of cells.

The input reward data for the load balancing may include but is not limited to load of a cell.

In addition, the output data #1 may include a probability of each of a plurality of types of possible cell load.

The processing network element may send the output data #1 to the access network device #1, so that the access network device #1 may adjust a network parameter, for example, a parameter that can determine a difficulty degree of cell selection, reselection, and handover, based on the output data #1.

Scenario 8. Cell Coverage Optimization, for Example, Minimization of Drive Tests (MDT)

Specifically, to improve coverage and quality of service, reduce costs of manual drive tests, and the like, the solution in this application may be applied to the MDT or coverage and capacity optimization (CCO), to assist in automatic cell coverage optimization, or indicate a cell coverage status. That is, there are two types of output data: one is a network decision related to an action of adjusting cell coverage, and the other includes a network status indicating a cell coverage status.

When the AI module is used in supervised learning to improve the MDT, the training data is a network status and a label. The network status herein may be an MDT report. The label is a cell coverage status represented by the MDT report. The MDT report includes indicators such as a signal quality measurement result, signal power, interference power, a packet delay, a packet loss rate, a received signal strength indicator, round trip time, measurement occurrence time, longitude and latitude, a location, a UE orientation, and a UE speed. The MDT report may come from a plurality of UEs at a same location, or may come from a plurality of locations of same UE. The label may be a probability of a coverage status.

For example, if the inference result of the AI module is that a probability of weak coverage is 90%, the network-side node automatically adjusts an antenna or a beam to enhance coverage of this location in consideration of this case. However, coverage enhancement of this cell leads to enhanced interference of a neighboring cell. Therefore, the input of the AI module may include an MDT report of UE camping on the neighboring cell at the same location. In addition, coverage of the neighboring cell is output. If the coverage of the neighboring cell is strong, coverage of the local cell is considered not to be enhanced, so that the neighboring cell can cover a current area better. By analogy, an algorithm may be designed for a communication system and a final network decision is made based on an output of the AI module. When the AI module is used in reinforcement learning to improve the MDT, the input data is a network status and network performance, and the output data is a network decision. When the reinforcement learning is used to enhance the communication system, a small range of feasible configurations of the system may be explored to automatically improve system performance. The improvement of the system performance may be long-time and is enabled by a system parameter configuration dominated by reinforcement learning.

The interaction process shown in FIG. 6 may be used in the scenario 8.

That is, in this case, the task #1 may include a process of determining a coverage adjustment policy for a cell of the access network device #1.

In the scenario 8, the input status data includes a minimization of drive tests MDT report of a particular cell, the input reward data includes coverage of the cell, and the output data includes a probability of using each of a plurality of coverage adjustment policies (for example, an adjustment policy for adjusting an antenna pitch angle or power) for the cell.

Scenario 9. Cell Capacity Optimization, for Example, CCO

The interaction process shown in FIG. 6 may be used in the scenario 9.

That is, in this case, the task #1 may include a process of determining a capacity adjustment policy for a cell of the access network device #1.

In the scenario 9, the input status data includes a minimization of drive tests report of a particular cell, a measurement report of a terminal device in the cell, and a user behavior profile of the terminal device in the cell, the input reward data includes coverage and a cell capacity of the cell, and the output data includes a probability of using each of a plurality of capacity adjustment policies (for example, an adjustment policy for adjusting an antenna pitch angle and power) for the cell.

Scenario 10: Cell Energy Saving Optimization

The interaction process shown in FIG. 6 may be used in the scenario 10.

That is, in this case, the task #1 may include a process of determining an energy saving policy for a cell of the access network device #1.

In the scenario 10, the input status data includes power consumption of a particular cell and a user behavior profile of a terminal device in the cell, the input reward data includes energy efficiency of the cell, and the output data includes a probability of using each of a plurality of power consumption adjustment policies for the cell. In addition, a processing process in the scenario 10 is similar to the process shown in FIG. 6. To avoid repetition, detailed description thereof is omitted herein.

Scenario 11: Handover Optimization of a Terminal Device with Energy Saving as a Target The interaction process shown in FIG. 6 may be used in the scenario 11.

That is, in this case, the task #1 may include a process of determining a decision result of whether one or more terminals in a cell of the access network device #1 need to be handed over to another cell.

In the scenario 11, the input status data includes power consumption and load of a plurality of cells, and a user behavior profile of a terminal device in the cell, the input reward data includes average power consumption of the plurality of cells, and the output data includes a determining result of whether one or more terminal devices in the plurality of cells need to be handed over from a currently located cell. Alternatively, the output data includes a probability that one or more terminal devices in the plurality of cells need to be handed over to each of the plurality of cells. In addition, a processing process in the scenario 11 is similar to the process shown in FIG. 6. To avoid repetition, detailed description thereof is omitted herein.

Scenario 12: Handover Optimization of a Terminal Device with Load Balancing as a Target The interaction process shown in FIG. 6 may be used in the scenario 11.

That is, in this case, the task #1 may include a process of determining a decision result of whether one or more terminals in a cell of the access network device #1 need to be handed over to another cell.

In the scenario 12, the input status data includes power consumption and load of a plurality of cells, and a user behavior profile of a terminal device in the cell, the input reward data includes an average of the load of the plurality of cells, and the output data includes a determining result of whether one or more terminal devices in the plurality of cells need to be handed over from a currently located cell. Alternatively, the output data includes a probability that one or more terminal devices in the plurality of cells need to be handed over to each of the plurality of cells. In addition, a processing process in the scenario 11 is similar to the process shown in FIG. 6. To avoid repetition, detailed description thereof is omitted herein.

Scenario 13: Parameter Configuration Optimization of an Access Network Device

The interaction process shown in FIG. 6 may be used in the scenario 13.

That is, in this case, the task #1 may include a process of determining a configuration parameter for the access network device #1.

In the scenario 13, the input status data includes a traffic report of a particular access network device, a channel quality of the access network device, a service type report of a service provided by the access network device, and a service rate requirement of the service provided by the access network device, and the output data includes a probability of each configuration parameter being used in parameter configurations corresponding to a plurality of quantities. In addition, a processing process in the scenario 11 is similar to the process shown in FIG. 6. To avoid repetition, detailed description thereof is omitted herein.

According to the solution provided in this application, artificial intelligence (AI) needs to be used to assist in drawing inferences of network behavior, so that impact of incorrect network behavior on communication performance can be avoided, thereby improving user experience.

Figure 7:
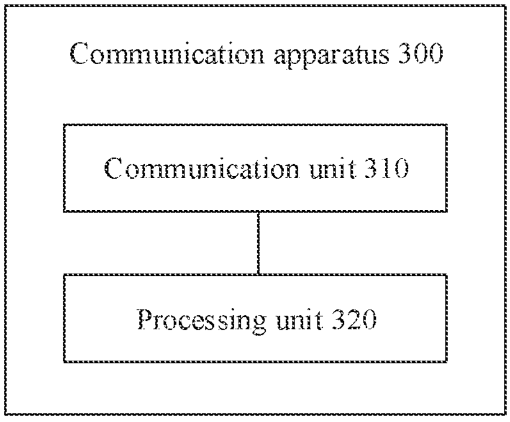
FIG. 7 is a schematic diagram of an example of a communication apparatus according to this application.

FIG. 7 is a schematic block diagram of a communication apparatus according to an embodiment of this application. As shown in FIG. 7, the apparatus 300 may include a communication unit 310 and a processing unit 320. The communication unit 310 may communicate with an outside, and the processing unit 320 is configured to perform data processing. The communication unit 310 may also be referred to as a communication interface or a transceiver unit.

In a possible design, the apparatus 300 may implement steps or procedures corresponding to and performed by the initiating network element (for example, the terminal device #A or the access network device #1) in the foregoing method embodiments. The processing unit 320 is configured to perform an operation related to processing of the initiating network element in the foregoing method embodiments. The communication unit 310 is configured to perform operations related to sending and receiving of the initiating network element in the foregoing method embodiments.

In another possible design, the apparatus 300 may implement steps or procedures corresponding to and performed by the processing network element in the foregoing method embodiments. The communication unit 310 is configured to perform operations related to sending and receiving of the processing network element in the foregoing method embodiments. The processing unit 320 is configured to perform an operation related to processing of the processing network element in the foregoing method embodiments.

In still another possible design, the apparatus 300 may implement steps or procedures corresponding to and performed by the storage network element in the foregoing method embodiments. The communication unit 310 is configured to perform operations related to sending and receiving of the storage network element in the foregoing method embodiments. The processing unit 320 is configured to perform an operation related to processing of the storage network element in the foregoing method embodiments.

It should be understood that the apparatus 300 herein is embodied in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 300 may be specifically the initiating network element in the foregoing embodiments, and may be configured to perform procedures and/or steps corresponding to initiating in the foregoing method embodiments, the apparatus 300 may be specifically the processing network element in the foregoing embodiments, and may be configured to perform procedures and/or steps corresponding to the processing network element in the foregoing method embodiments, or the apparatus 300 may be specifically the storage network element in the foregoing embodiments, and may be configured to perform procedures and/or steps corresponding to the storage network element in the foregoing method embodiments. To avoid repetition, details are not described herein again.

The apparatus 300 of each of the foregoing solutions has a function of implementing corresponding steps performed by the initiating network element, the processing network element, or the storage network element in the foregoing methods. The function may be implemented by hardware, or may be implemented by hardware executing corresponding software. The hardware or software includes one or more modules corresponding to the foregoing functions. For example, the communication unit may be replaced by a transceiver (where for example, a sending unit in the communication unit may be replaced by a transmitter, and a receiving unit in the communication unit may be replaced by a receiver), and another unit, such as a processing unit, may be replaced by a processor, to separately perform sending and receiving operations and a related processing operation in each method embodiment.

In addition, the communication unit may be alternatively a transceiver circuit (for example, may include a receiving circuit and a sending circuit), and the processing unit may be a processing circuit. In this embodiment of this application, the apparatus in FIG. 7 may be the network element (for example, the initiating network element, the processing network element, or the storage network element) in the foregoing embodiments, or may be a chip or a chip system, for example, a system on chip (SoC), configured in the network element. The communication unit may be an input/output circuit or a communication interface. The processing unit is a processor, a microprocessor, or an integrated circuit integrated on the chip. This is not limited herein.

Figure 8:
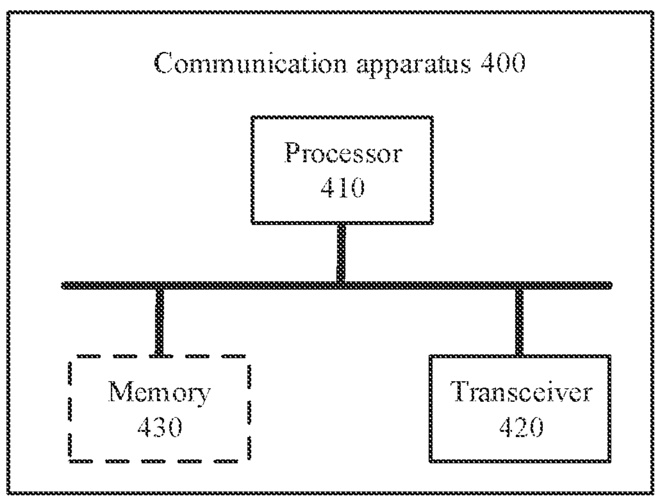
FIG. 8 is a schematic diagram of another example of a communication apparatus according to this application.

FIG. 8 shows a communication apparatus 400 according to an embodiment of this application. The apparatus 400 includes a processor 410 and a transceiver 420. The processor 410 and the transceiver 420 communicate with each other by using an internal connection path. The processor 410 is configured to execute instructions, to control the transceiver 420 to send a signal and/or receive a signal.

Optionally, the apparatus 400 may further include a memory 430. The memory 430 communicates with the processor 410 and the transceiver 420 by using an internal connection path. The memory 430 is configured to store instructions, and the processor 410 may execute the instructions stored in the memory 430. In a possible implementation, the apparatus 400 is configured to implement procedures and steps corresponding to the initiating network element (for example, the terminal device #A or the access network device #1) in the foregoing method embodiments. In another possible implementation, the apparatus 400 is configured to implement procedures and steps corresponding to the processing network element or the storage network element in the foregoing method embodiments.

It should be understood that the apparatus 400 may be specifically the network element (for example, the initiating network element, the processing network element, or the storage network element) in the foregoing embodiments, or may be a chip or a chip system in the network element. Correspondingly, the transceiver 420 may be a transceiver circuit of the chip. This is not limited herein. Specifically, the apparatus 400 may be configured to perform steps and/or procedures corresponding to the network element in the foregoing method embodiments. Optionally, the memory 430 includes a read-only memory and a random access memory, and provide an instruction and data to the processor. Apart of the memory may further include a non-volatile random access memory. For example, the memory may further store information about a device type. The processor 410 may be configured to execute the instructions stored in the memory. When the processor 410 executes the instructions stored in the memory, the processor 410 is configured to perform the steps and/or procedures in the foregoing method embodiments and corresponding to the network element (for example, the initiating network element, the processing network element, or the storage network element).

In an implementation process, the steps in the foregoing methods can be implemented by using a hardware integrated logic circuit in the processor, or by using instructions in a form of software. The steps of the method disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor in this embodiment of this application may implement or perform the methods, steps, and logical block diagrams disclosed in the embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Figure 9:
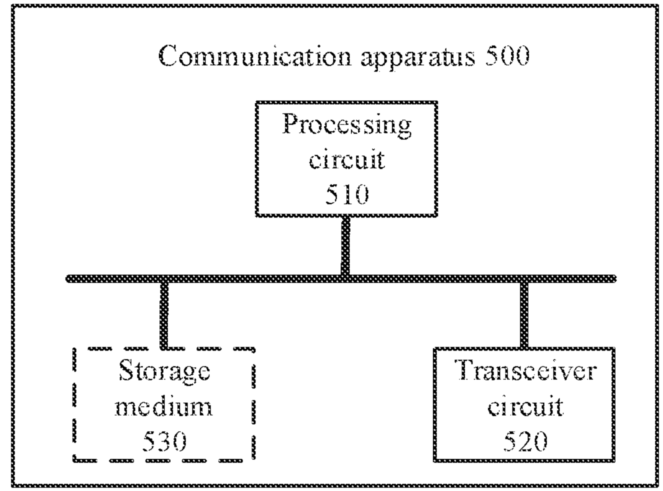
FIG. 9 is a schematic diagram of still another example of a communication apparatus according to this application.

FIG. 9 shows a communication apparatus 500 according to an embodiment of this application. The apparatus 500 includes a processing circuit 510 and a transceiver circuit 520. The processing circuit 510 and the transceiver circuit 520 communicate with each other by using an internal connection path. The processing circuit 510 is configured to execute instructions, to control the transceiver circuit 520 to send a signal and/or receive a signal.

Optionally, the apparatus 500 may further include a storage medium 530. The storage medium 530 communicates with the processing circuit 510 and the transceiver circuit 520 by using an internal connection path. The storage medium 530 is configured to store instructions, and the processing circuit 510 may execute the instructions stored in the storage medium 530. In a possible implementation, the apparatus 500 is configured to implement procedures and steps corresponding to the initiating network element (for example, the terminal device #A or the access network device #1) in the foregoing method embodiments. In another possible implementation, the apparatus 500 is configured to implement procedures and steps corresponding to the processing network element in the foregoing method embodiments.

Figure 10:
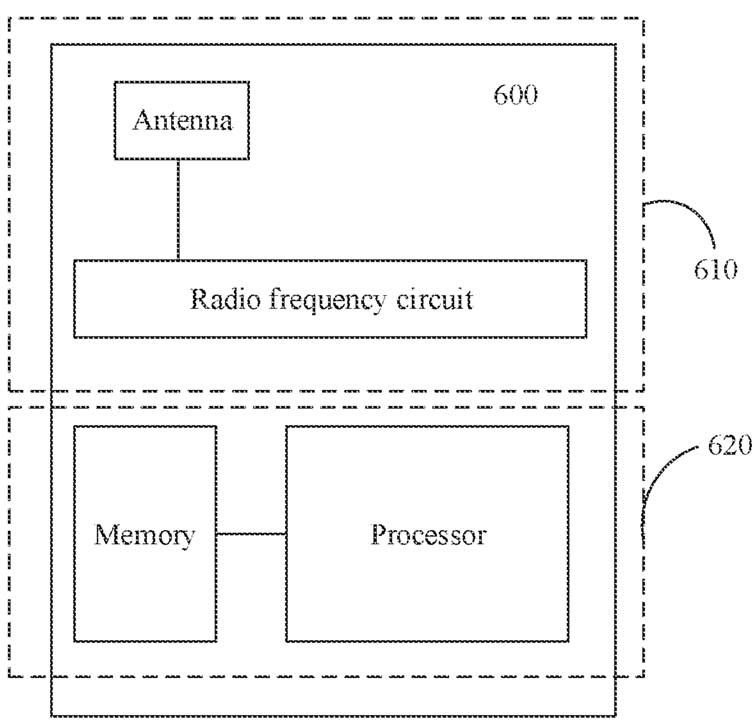
FIG. 10 is a schematic diagram of an example of a terminal device according to this application.

FIG. 10 is a schematic diagram of an example of an access network device 600 according to this application. The apparatuses shown in FIG. 7 to FIG. 9 may be configured on or are the access network device 600 shown in FIG. 10. As shown in FIG. 10, the access network device 600 includes a part 610 and a part 620. The part 610 is mainly configured to transmit and receive a radio frequency signal and perform conversion between the radio frequency signal and a baseband signal. The part 620 is mainly configured to perform baseband processing and control the access network device 600. The part 610 may be generally referred to as a transceiver unit, a transceiver, a transceiver circuit, a transceiver, or the like. The part 620 is usually a control center of the access network device 600, may be generally referred to as a processing unit, and is configured to control the access network device 600 to perform a processing operation of the access network device 600 (for example, the access network device #1) in the foregoing method embodiments.

The transceiver unit in the part 610 may also be referred to as a transceiver, a transceiver, or the like, and includes an antenna and a radio frequency circuit, where the radio frequency circuit is mainly configured to perform radio frequency processing. Optionally, a device configured to implement a receiving function in the part 610 may be considered as a receiving unit, and a device configured to implement a sending function may be considered as a sending unit, that is, the part 610 includes the receiving unit and the sending unit. For example, the receiving unit may also be referred to as a receiver, a receive machine, a receiving circuit, or the like, and the sending unit may be referred to as a transmitter, a transmit machine, a transmitting circuit, or the like.

The part 620 may include one or more boards, and each board may include one or more processors and one or more memories. The processor is configured to read and execute a program in the memory, to implement a baseband processing function and control a base station. If there is a plurality of boards, the boards may be interconnected to enhance a processing capability. In an optional implementation, a plurality of boards may share one or more processors, a plurality of boards share one or more memories, or a plurality of boards share one or more processors.

For example, in an implementation, the transceiver unit in the part 610 is configured to perform the steps related to sending and receiving and performed by the access network device 600 in the embodiments. The part 620 is configured to perform steps related to processing and performed by the access network device 600.

It should be understood that FIG. 10 is merely an example rather than a limitation, and the network device including the transceiver unit and the processing unit may not depend on the structure shown in FIG. 10.

Figure 11:
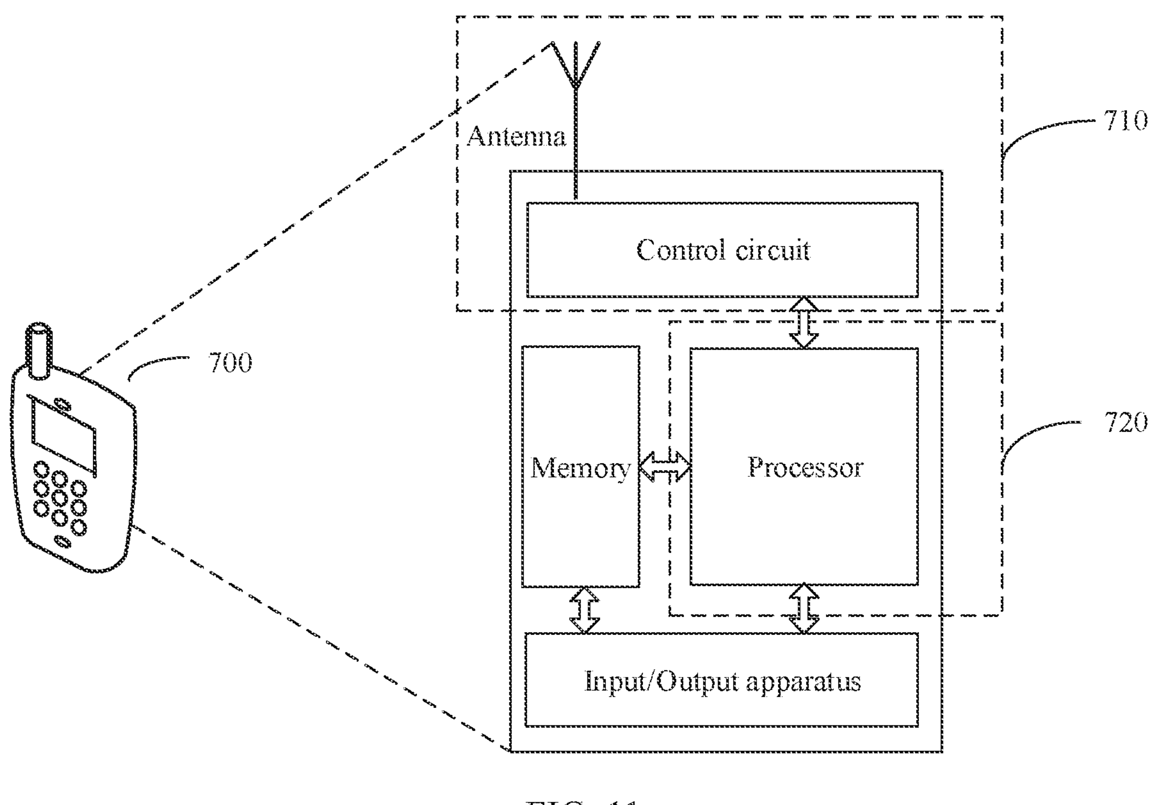
FIG. 11 is a schematic diagram of an example of an access network device according to this application.

FIG. 11 is a schematic diagram of a structure of a terminal device 700 according to this application. The communication apparatuses shown in FIG. 7 to FIG. 9 may be configured on or may be the terminal device 700. In other words, the terminal device 700 may perform an action performed by the terminal device (for example, the terminal device #A) in the foregoing methods.

For ease of description, FIG. 11 shows only main components of the terminal device. As shown in FIG. 11, the terminal device 700 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing the actions described in the foregoing embodiments of the methods for indicating a transmission precoding matrix. The memory is mainly configured to store the software program and the data, for example, store the codebook described in the foregoing embodiments. The control circuit is mainly configured to perform conversion between a baseband signal and a radio frequency signal, and process the radio frequency signal. A combination of the control circuit and the antenna may also be referred to as a transceiver, mainly configured to send/receive a radio frequency signal in an electromagnetic wave form. The input/output apparatus, for example, a touchscreen, a display, or a keyboard, is mainly configured to receive data entered by a user and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 11 shows only one memory and one processor. In an actual terminal device, there may be a plurality of processors and a plurality of memories. The memory may also be referred to as a storage medium, a storage device, or the like. This is not limited in embodiments of this application.

For example, the processor may include a baseband processor and a central processing unit. The baseband processor is mainly configured to process a communication protocol and communication data. The central processing unit is mainly configured to control the entire terminal device, execute software program, and process data of the software program. The processor in FIG. 11 integrates functions of the baseband processor and the central processing unit. A person skilled in the art may understand that the baseband processor and the central processing unit may be alternatively independent processors, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in a storage unit in a form of the software program. The processor executes the software program to implement a baseband processing function.

For example, in this embodiment of this application, an antenna and a control circuit that have a transceiver function may be considered as the transceiver unit 710 of the terminal device 700, and a processor that has a processing function may be considered as the processing unit 720 of the terminal device 700. As shown in FIG. 11, the terminal device 700 includes the transceiver unit 710 and the processing unit 720. The transceiver unit may also be referred to as a transceiver, a transceiver machine, a transceiver apparatus, or the like. Optionally, a device configured to implement a receiving function in the transceiver unit 710 may be considered as a receiving unit, and a device configured to implement a sending function in the transceiver unit 710 may be considered as a sending unit, that is, the transceiver unit includes the receiving unit and the sending unit. For example, the receiving unit may also be referred to as a receiver machine, a receiver, a receiving circuit, or the like, and the sending unit may be referred to as a transmitter machine, a transmitter, a transmitting circuit, or the like.

According to a method provided in an embodiment of this application, this application further provides a computer program product. The computer program product includes computer program code. When the computer program code runs on a computer, the computer is enabled to perform the method in the embodiment shown in FIG. 5 or FIG. 6.

According to a method provided in an embodiment of this application, this application further provides a computer readable medium. The computer readable medium stores program code. When the program code runs on a computer, the computer is enabled to perform the method in the embodiment shown in FIG. 5 or FIG. 6.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of random access memories (RAMs) can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In several embodiments provided in this application, it should be understood that the disclosed system, apparatus, and method may be implemented in another manner. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments. In addition, functional units in embodiments of this application may be integrated into one processing unit, each of the units may exist alone physically, or two or more units may be integrated into one unit. When functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining, by a first communication apparatus, a first artificial intelligence (AI) model corresponding to a first task;

obtaining, by the first communication apparatus, first data corresponding to a first feature, wherein the first feature is a feature of data processed by using the first AI model, and the first data is used for drawing inferences for decision-making of the first task; and determining, by the first communication apparatus, an inference result for the decision-making of the first task based on the first data and the first AI model, wherein the first data includes at least one of: a channel measurement report, a user behavior profile, network performance data, or resource utilization data, and wherein the inference result comprises a probability of each of a plurality of possible decision results for the first task, wherein the first communication apparatus sends a third request to a second communication apparatus requesting the first data, the third request comprising indication information of the first feature, and wherein the first communication apparatus is a network data analytics function (NWDAF) and the second communication apparatus is one of an access network device or a terminal device.

2. The method according to claim 1, wherein the first task is a task for a second communication apparatus, and the method further comprises:

sending, by the first communication apparatus, the inference result to the second communication apparatus.

3. The method according to claim 2, wherein the method further comprises:

receiving, by the first communication apparatus, a first request sent by the second communication apparatus, wherein the first request is used to request the inference result for the decision-making of the first task, and the first request comprises an identifier of the first task.

4. The method according to claim 1, wherein the obtaining, by the first communication apparatus, the first AI model corresponding to the first task comprises:

determining, by the first communication apparatus based on a first mapping relationship, the first AI model corresponding to an identifier of the first task, wherein the first mapping relationship is used to indicate a correspondence between a plurality of identifiers and a plurality of AI models.

5. The method according to claim 1, wherein the obtaining, by the first communication apparatus, the first AI model corresponding to the first task comprises:

sending, by the first communication apparatus, a second request to a third communication apparatus, wherein the second request comprises an identifier of the first task, and the second request is used to request to obtain the first AI model corresponding to the identifier of the first task; and receiving, by the first communication apparatus, the first AI model sent by the third communication apparatus.

6. The method according to claim 5, wherein the first task is a task for a second communication apparatus, and the obtaining, by the first communication apparatus, first data corresponding to a first feature comprises:

sending, by the first communication apparatus, a third request to the second communication apparatus, wherein the third request comprises indication information of the first feature, and the second request is used to request to obtain data corresponding to the first feature; and receiving, by the first communication apparatus, the first data sent by the second communication apparatus.

7. The method according to claim 1, wherein the method further comprises:

sending, by the first communication apparatus, a correspondence between an identifier of the first task, the first data, and the inference result to a fourth communication apparatus, wherein the fourth communication apparatus is configured to store training data of the first AI model.

8. A method, comprising:

sending, by a second communication apparatus, a first request to a first communication apparatus, wherein the first request is used to request an inference result for decision-making of a first task, and the first request comprises an identifier of the first task;

receiving, by the second communication apparatus, a third request sent by the first communication apparatus, wherein the third request comprises indication information of a first feature, and the third request is used to request to obtain data corresponding to the first feature;

sending, by the second communication apparatus, first data corresponding to the first feature to the first communication apparatus; and receiving, by the second communication apparatus, the inference result sent by the first communication apparatus, wherein the inference result is determined based on the first data and a first artificial intelligence (AI) model corresponding to the first task, and the first feature is a feature of data processed by using the first AI model, wherein the first data includes at least one of: a channel measurement report, a user behavior profile, network performance data, or resource utilization data, and wherein the inference result comprises a probability of each of a plurality of possible decision results for the first task, wherein the first communication apparatus sends a third request to a second communication apparatus requesting the first data, the third request comprising indication information of the first feature, and wherein the first communication apparatus is a network data analytics function (NWDAF) and the second communication apparatus is one of an access network device or a terminal device.

9. The method according to claim 8, wherein the method further comprises:

sending, by the first communication apparatus, a correspondence between the identifier of the first task, the first data, and the inference result to a fourth communication apparatus, wherein the fourth communication apparatus is configured to store training data of the first AI model.

10. The method according to claim 8, wherein the decision-making of the first task comprises a plurality of decision results, and the inference result comprises a probability of each of the plurality of decision results.

11. The method according to claim 8, wherein the first task comprises mobility enhancement optimization of a terminal device, and the first data comprises at least one of the following data:

a first measurement report of the terminal device, a first user behavior profile of the terminal device, and resource utilization of the terminal device; and the inference result for the decision-making of the first task comprises a size of a reserved resource of the terminal device.

12. The method according to claim 8, wherein the first task comprises access mode optimization of a terminal device, and the first data comprises at least one of the following data:

a second measurement report of the terminal device and a random access report of the terminal device; and the inference result for the decision-making of the first task comprises a quantity of times of two-step random access attempts of the terminal device.

13. The method according to claim 8, wherein the first task comprises mobility robustness optimization of a terminal device, and the first data comprises at least one of the following information:

a third measurement report of the terminal device and a handover report of the terminal device; and the inference result for the decision-making of the first task comprises a handover policy of the terminal device, or the inference result for decision-making of the first task comprises a handover effect corresponding to a handover policy of the terminal device.

14. The method according to claim 8, wherein the first task comprises handover optimization of a terminal device, and the first data comprises at least one of load of a plurality of cells, power consumption of the plurality of cells, second user behavior profiles of terminal devices in the plurality of cells, an average of the power consumption of the plurality of cells, or an average load of the plurality of cells; and the inference result for the decision-making of the first task comprises a handover policy of one or more terminals in the plurality of cells.

15. The method according to claim 8, wherein the first task comprises radio access network notification area optimization, and the first data comprises at least one of the following data:

a second user behavior profile of a terminal device accessing a radio access network, a location of a first cell of the radio access network, and signaling overheads of a notification area of the radio access network; and the inference result for the decision-making of the first task comprises a probability of providing the first cell as a notification area for the terminal device and not providing the first cell as a notification area for the terminal device.

16. The method according to claim 8, wherein the first task comprises radio resource management policy optimization of a terminal device, and the first data comprises at least one of the following data:

a third user behavior profile of the terminal device, a quantity of active users of a cell in which the terminal device is located, and resource utilization of the terminal device; and the inference result for the decision-making of the first task comprises a radio resource management policy.

17. The method according to claim 8, wherein the first task comprises optimization of matching between an application layer of a terminal device and a radio access network, and the first data comprises at least one of the following data:

a fourth user behavior profile of the terminal device, a rate requirement of a first application of the terminal device, and quality of service of the terminal device; and the inference result for the decision-making of the first task comprises an adjustable rate of the first application.

18. The method according to claim 8, wherein the first task comprises mobility load balancing optimization of a cell, and the first data comprises load of the cell and a fifth user behavior profile of a terminal device in the cell; and the inference result for the decision-making of the first task comprises measurement of mobility processing of one or more terminal devices in the cell, and the mobility processing comprises at least one of cell reselection, cell handover, or cell selection.

19. The method according to claim 8, wherein the first task comprises coverage optimization of a cell, and the first data comprises a minimization of drive tests MDT report of the cell and coverage of the cell; and the inference result for the decision-making of the first task comprises a coverage adjustment policy of the cell.

20. A communication apparatus, comprising:

at least one processor;

a transceiver; and one or more memories coupled to the at least one processor and storing programming instructions for execution by the at least one processor to cause the communication apparatus to:

determine a first artificial intelligence (AI) model corresponding to a first task;

receive, through the transceiver, first data corresponding to a first feature, wherein the first feature is a feature of data processed by using the first AI model, and the first data is used for drawing inferences for decision-making of the first task; and determine an inference result for the decision-making of the first task based on the first data and the first AI model, wherein the first data includes at least one of: a channel measurement report, a user behavior profile, network performance data, or resource utilization data, and wherein the inference result comprises a probability of each of a plurality of possible decision results for the first task, wherein the communication apparatus sends a third request to another communication apparatus requesting the first data, the third request comprising indication information of the first feature, and wherein the communication apparatus is a network data analytics function (NWDAF) and the another communication apparatus is one of an access network device or a terminal device.

* * * * *